(12) United States Patent
Jachuck

(10) Patent No.: US 10,816,270 B2
(45) Date of Patent: Oct. 27, 2020

(54) PASSIVE HEAT AND MASS TRANSFER SYSTEM

(71) Applicant: Advanced Technology Management Group LLC, Boca Raton, FL (US)

(72) Inventor: Roshan Jachuck, Boca Raton, FL (US)

(73) Assignee: Advanced Technology Management Group LLC, Boca Raton, FL (US)

( * ) Notice: Subject to any disclaimer, the term of this patent is extended or adjusted under 35 U.S.C. 154(b) by 138 days.

(21) Appl. No.: 16/113,656

(22) Filed: Aug. 27, 2018

(65) Prior Publication Data

US 2018/0363986 A1    Dec. 20, 2018

Related U.S. Application Data

(63) Continuation of application No. 15/174,381, filed on Jun. 6, 2016, now Pat. No. 10,060,679.

(Continued)

(51) Int. Cl.
*F28D 3/02*    (2006.01)
*B01D 1/22*    (2006.01)
(Continued)

(52) U.S. Cl.
CPC ............. *F28D 3/02* (2013.01); *B01D 1/0064* (2013.01); *B01D 1/065* (2013.01); *B01D 1/22* (2013.01);
(Continued)

(58) Field of Classification Search
CPC ......... F28D 3/02; F28D 3/04; F28D 21/0015; B01D 1/0064; B01D 1/22; B01F 3/04;
(Continued)

(56) References Cited

U.S. PATENT DOCUMENTS 3,500,893 A    3/1970    McReynolds
4,520,866 A    6/1985    Nakajima et al.
(Continued)

FOREIGN PATENT DOCUMENTS

DE    3643816    8/1987
DE    3916235    11/1990

OTHER PUBLICATIONS

Gea, "Evaporation Technology, Falling Film Evaporator," 1 page, 2016. http://www.gea.com/global/en/products/falling-film-evaporator.jsp.

(Continued)

*Primary Examiner* — Robert A Hopkins
(74) *Attorney, Agent, or Firm* — Akerman LLP; Michael K. Dixon

(57) ABSTRACT

A heat and mass transfer system configured to be a passive system using gravitational force to form a thin liquid film flow on an outer surface of a flow distribution head and downstream conduit member to subject the thin liquid film to heat transfer mediums. The at least partially spherical flow distribution head creates a uniform thin flow of liquid on the outer surface increasing the efficiency of the heat and mass transfer system. The heat and mass transfer system may include a heat transfer medium supply system in fluid communication with internal aspects of the downstream conduit such that a heat transfer medium flows within the downstream conduit while the liquid film flows on the outer surface of the downstream conduit. Rather than conventional sheet flow on inner surfaces of a conduit, the flow distribution head enables sheet flow to be formed on an outside surface of a component.

17 Claims, 29 Drawing Sheets

Related U.S. Application Data

(60) Provisional application No. 62/171,505, filed on Jun. 5, 2015.

(51) Int. Cl.

| | | |
|---|---|---|
| *B01F 3/04* | (2006.01) | |
| *F28C 1/02* | (2006.01) | |
| *F28C 1/14* | (2006.01) | |
| *F28D 3/04* | (2006.01) | |
| *F28D 21/00* | (2006.01) | |
| *F28G 13/00* | (2006.01) | |
| *F28F 25/06* | (2006.01) | |
| *B01D 1/00* | (2006.01) | |
| *F25B 39/04* | (2006.01) | |
| *F28F 25/02* | (2006.01) | |
| *F28C 1/00* | (2006.01) | |
| *B01D 3/10* | (2006.01) | |
| *C02F 1/08* | (2006.01) | |
| *B01D 5/00* | (2006.01) | |
| *B01D 1/26* | (2006.01) | |
| *B01D 1/06* | (2006.01) | |
| *B01D 3/14* | (2006.01) | |
| *B01D 61/36* | (2006.01) | |

(52) U.S. Cl.
CPC .............. *B01D 1/26* (2013.01); *B01D 3/10* (2013.01); *B01D 3/145* (2013.01); *B01D 5/0012* (2013.01); *B01F 3/04* (2013.01); *C02F 1/08* (2013.01); *F25B 39/04* (2013.01); *F28C 1/00* (2013.01); *F28C 1/02* (2013.01); *F28C 1/14* (2013.01); *F28D 3/04* (2013.01); *F28D 21/0015* (2013.01); *F28F 25/02* (2013.01); *F28F 25/06* (2013.01); *F28G 13/00* (2013.01); *B01D 61/362* (2013.01); *F28D 2021/0064* (2013.01)

(58) Field of Classification Search
CPC .... F28C 1/02; F28C 1/14; F28F 25/06; F28G 13/00
USPC .................................................. 165/115, 117
See application file for complete search history.

(56) References Cited

U.S. PATENT DOCUMENTS

| | | |
|---|---|---|
| 4,969,507 A | 11/1990 | Rosenblad |
| 5,802,961 A | 9/1998 | Hay et al. |
| 7,112,262 B2 | 9/2006 | Bethge |
| 7,875,248 B1 | 1/2011 | Jachuck |
| 8,003,058 B2 | 8/2011 | Jachuck et al. |
| 8,500,960 B2 | 8/2013 | Ehrenberg et al. |
| 8,753,576 B2 | 6/2014 | Jachuck |
| 2014/0367244 A1 | 12/2014 | Jachuck |

OTHER PUBLICATIONS

Wikipedia, "Rising film evaporator," 7 pages, 2013. https://en.wikipedia.org/wiki/Rising_film_evaporator.

LCI Corporation, 7 pages, 2016. http://lcicorp.com/thin_film_evaporators/thin_film_wiped_film_evaporator/.

Patent Cooperation Treaty, "International Search Report and Written Opinion," dated Sep. 2, 2016, by Blaine R. Copenheaver, Authorized Office, U.S. Searching Authority, in international application No. PCT/US2016/036029, document of 10 pages.

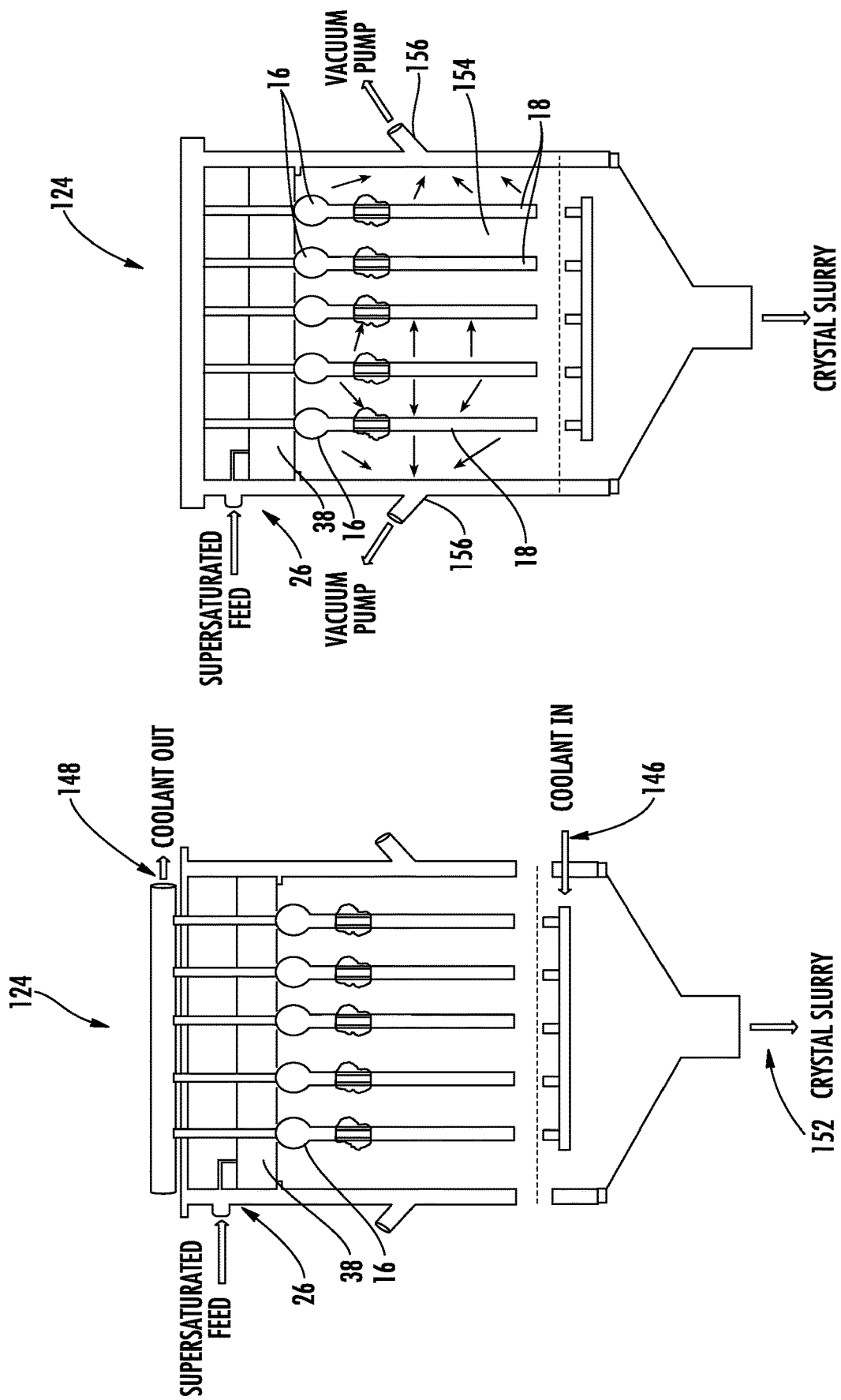

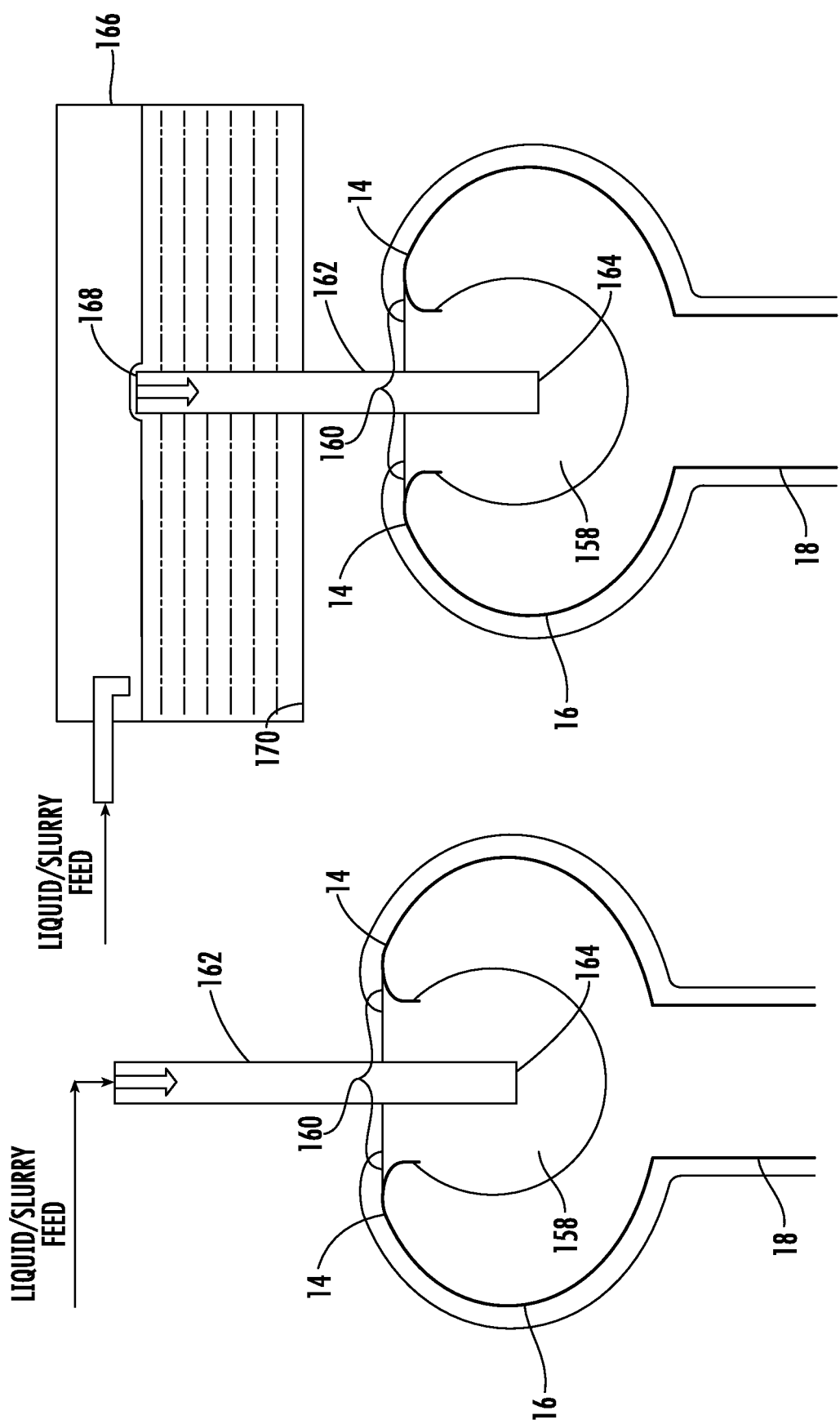

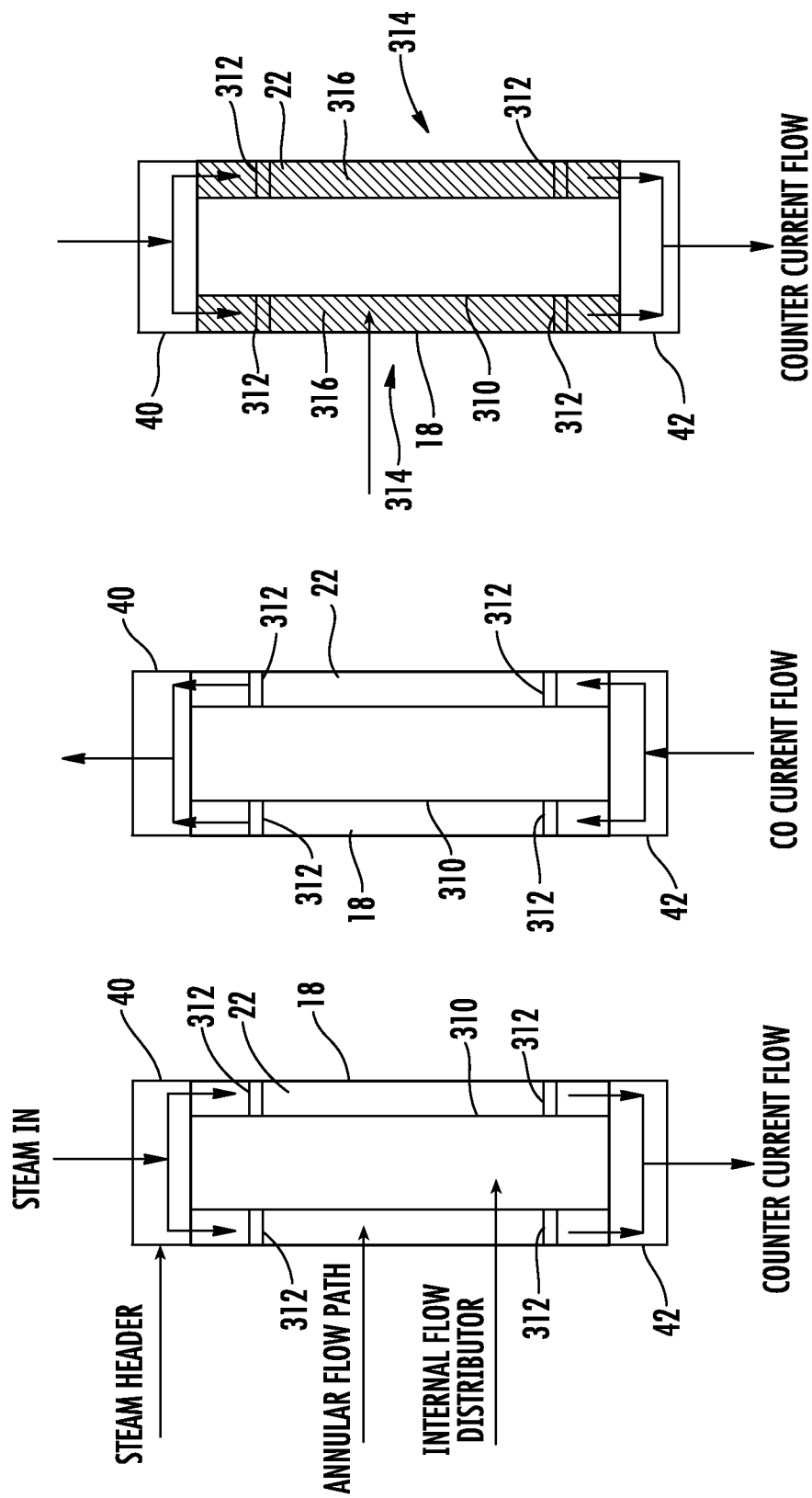

PASSIVE HEAT AND MASS TRANSFER SYSTEM

CROSS-REFERENCE TO RELATED APPLICATION

This application is a continuation of U.S. patent application Ser. No. 15/174,381, Filed Jun. 6, 2016, which claims the benefit of U.S. Provisional Patent Application No. 62/171,505, filed Jun. 5, 2015, the entirety of which is incorporated herein.

FIELD OF THE INVENTION

This invention is directed generally to heat and mass transfer systems, and more particularly to thin sheet flow heat transfer systems configured to be passive systems using gravitational flow resulting from a unique flow distribution configuration.

BACKGROUND

Conventional evaporators are typically formed from a plurality of tubes contained within a shell. Feed liquid is passed within the evaporator tubes, and hot gases or liquids are passed on the outside of the evaporator tubes to heat the tubes. Conventional evaporator tubes are configured such that a feed liquid to be heated forms a liquid film on inner surfaces of a conduit. The outer surfaces of the conduit is typically surrounded with steam.

There exist numerous types of evaporators. For example, there exist conventional falling film evaporators, shown by way of example and not limitation at http://www.gea.com/global/en/products/falling-film-evaporator.jsp, rising film evaporators, shown by way of example and not limitation at https://en.wikipedia.org/wiki/Rising film evaporator, wiped film evaporator, shown by way of example and not limitation at https://Icicorp.com/thin film evaporators/thin film wiped film evaporator/, and other thin film heat and mass transfer devices. These devices use flow geometries that position process feed fluids within vertical tubes (or a cylinder) and include heating systems, which typically uses steam, positioned on the outside of the tubes and within an outer housing, which is referred to as a shell. In a falling film evaporator, a thin liquid film flows along the inside wall of the vertical tubes from top to bottom and in the case of a rising film evaporator, the liquid film is pushed upwards from the bottom to top.

These systems experience a number of limitations. In particular, vapor is formed on the inside of the tubes leaving concentrate at the outlet of the conduit. Formation of the vapor within the tube increases the pressure within the tube, which increases the boiling point. In addition, conventional systems experience scale formation and buildup on the interior surfaces of the tubes, which also negatively affects heat transfer efficiency. Thus, a need exists for a more efficient heat and mass transfer system.

SUMMARY OF THE INVENTION

A heat and mass transfer system configured to be a passive system using gravitational force to form a thin liquid film flow on an outer surface of a flow distribution head and downstream conduit member to subject the thin liquid film to heat transfer mediums or mass transfer mediums, or a combination of both, is disclosed. As such, the feed liquid flows on the outside of a flow distribution head and downstream conduit member while a heat transfer medium flows on an inside of the downstream conduit. This configuration creates more efficient evaporation rates. In particular, in embodiments where the heat transfer medium passing within the downstream conduit is steam, the steam is passed within the downstream conduit. The steam condenses and forms condensate droplets, which can form a film, on the inner surfaces of the downstream conduit, but the incoming steam forces the condensate droplets out of the downstream conduit, thereby preventing the condensate droplets from remaining on the inner surfaces and acting as an insulator. Thus, configuring the heat transfer medium, such as steam, to be passed through internal aspects of the downstream conduits enhances the efficiency of the heat and mass transfer system in comparison to conventional systems.

The flow distribution head may be formed from any shape capable of creating a liquid distribution on an outer surface of the flow distribution head. The flow distribution head forms uniform distribution of a liquid film along the downstream conduit, thereby creating a basis for heat and mass transfer to occur within the liquid substrate. In at least one embodiment, the flow distribution head may be at least partially spherical. In other embodiments, the flow distribution head may be any nonlinear surface, such as, but not limited to, a tapered surface. The flow distribution head may create a uniform thin flow of liquid on the outer surface increasing the efficiency of the heat and mass transfer system. Rather than sheet flow on inner surfaces of a conduit, as done conventionally, the flow distribution head enables sheet flow to be formed on an outside surface of, such as, but not limited to, a tube. Most noteworthy, the flow distribution head enables the sheet flow to be formed in a uniform manner on the outer surface on the flow distribution head and continuing on to a surface attached to the flow distribution head. The thickness of the film of feed liquid forming the sheet flow may be between about 5 microns and about 5 millimeters (mm), and in waste oil applications, may be have a larger thickness. The heat and mass transfer system may include one or more heat transfer medium supply systems in fluid communication with internal aspects of the downstream conduit such that at least one heat transfer medium is delivered to the downstream conduit while the liquid film flows on the outer surface of the downstream conduit. The flow of heat transfer medium within the downstream conduit is generally co-current flow, but in at least one embodiment, the flow of heat transfer medium may be counter-current flow relative to the flow of liquid film on the outer surface of the downstream conduit.

In at least one embodiment, a feed liquid to be heated flows on an outer surface of a downstream conduit. As the feed liquid is heated from within the downstream conduit, the liquid on the outer surface of the downstream conduit is unrestricted to evaporate and does not impart any pressure on liquid flowing downward on the outer surface of the downstream conduit.

An advantage of the heat and mass transfer system is that in embodiments where a heat transfer medium passing within the downstream conduit is steam, the steam condenses and forms condensate droplets on the inner surfaces of the downstream conduit. The incoming steam forces the condensate droplets out of the downstream conduit, thereby preventing the condensate droplets from remaining on the inner surfaces and acting as an insulator. Thus, configuring the heat transfer medium, such as steam, to be passed through internal aspects of the downstream conduits enhances the efficiency of the heat and mass transfer system in comparison to conventional systems.

Another advantage of the heat and mass transfer system is that by positioning a feed liquid on outer surfaces of the flow distribution head and downstream conduit, the feed liquid is able to evaporate in an environment without additional pressure. IN particular, the feed liquid does not experience pressure from evaporation occurring within the shell at the same level as the pressure increase found within evaporation tubes of conventional systems. Thus, the heat and mass transfer system is more efficient than conventional systems.

Yet another advantage of the heat and mass transfer system is that the heat and mass transfer system includes one or more flow distribution heads which enables a feed fluid to form a uniform, thin, liquid film on an outer surface of a surface, such as, but not limited to, a conduit, extending downwardly from the flow distribution head.

Another advantage of the heat and mass transfer system is that the heat and mass transfer system minimizes the temperature gradient between the feed fluid flowing on the outer surface of the downstream conduit and wall forming the downstream conduit, thereby greatly reducing, if not eliminating, the ability of scale to form.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 17 is a schematic, side view of a cooling unit configured for use in the multi-effect crystallizer system of FIG. 16, whereby the cooling unit uses a coolant.

FIG. 18 is a schematic, side view of a cooling unit configured for use in the multi-effect crystallizer system of FIG. 16, whereby the cooling unit uses a vacuum to cause evaporative cooling.

FIG. 19 is a schematic, side view of an alternative embodiment of the flow distribution head.

FIG. 20 is a schematic, side view of another alternative embodiment of the flow distribution head.

FIG. 29 is a cross-sectional side view of a downstream conduit, which may be a heat transfer conduit, with an internal flow distributor positioned within the downstream conduit and configured to increase the efficiency of the system by keeping the heat transfer medium in contact with the wall forming the downstream conduit rather than in internal aspects of the downstream conduit.

FIG. 30 is a cross-sectional side view of a downstream conduit, which may be a heat transfer conduit, with an internal flow distributor, as shown in FIG. 29, with the heat transfer medium flowing in an opposite direction through the downstream conduit.

FIG. 31 is a cross-sectional side view of a downstream conduit, which may be a heat transfer conduit, with an internal flow distributor, as shown in FIG. 29, and a heat transfer enhancement structure.

DETAILED DESCRIPTION OF THE INVENTION

Figure 1:
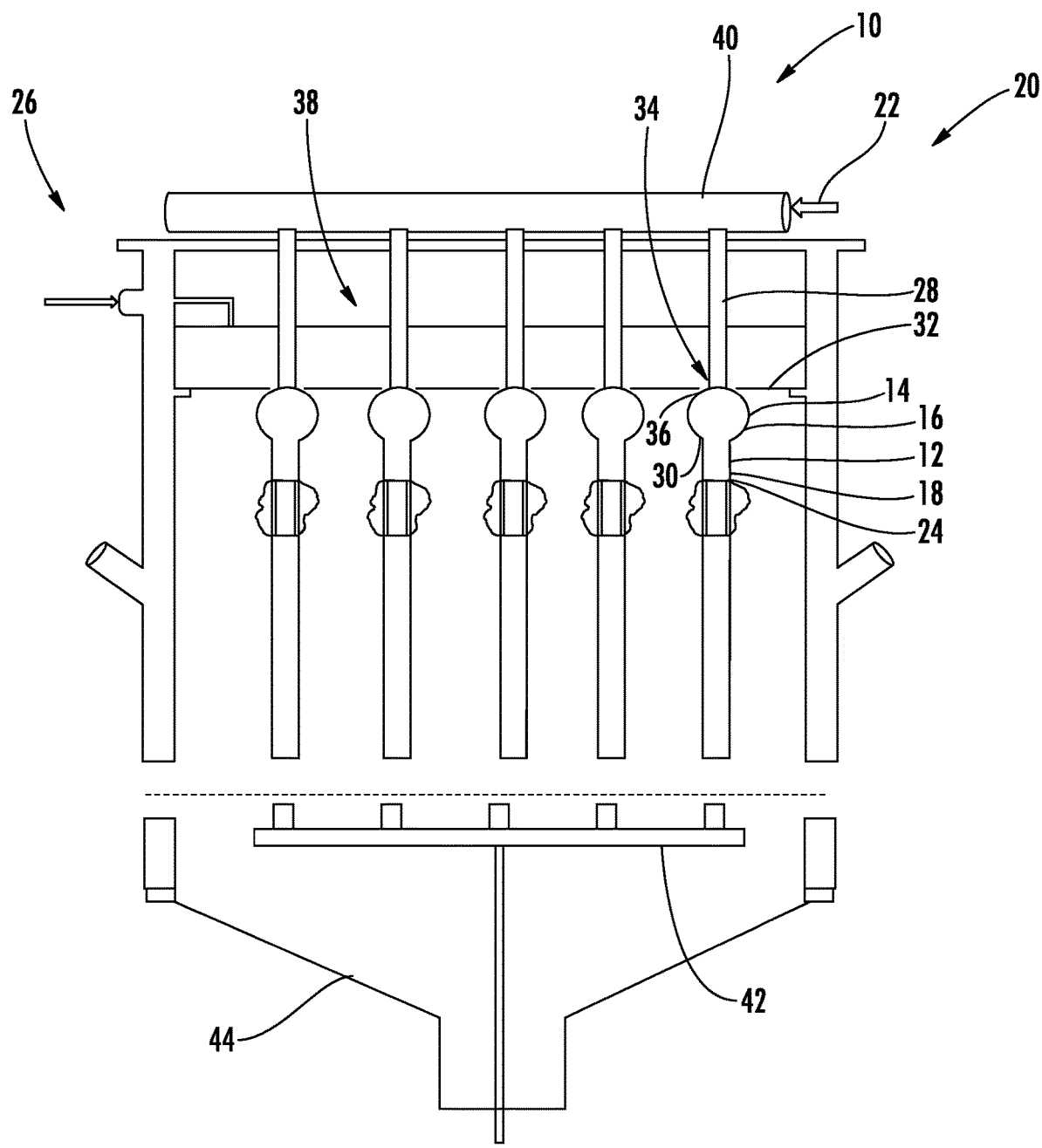
FIG. 1 is a schematic, side view of the heat and mass transfer system.
Figure 2:
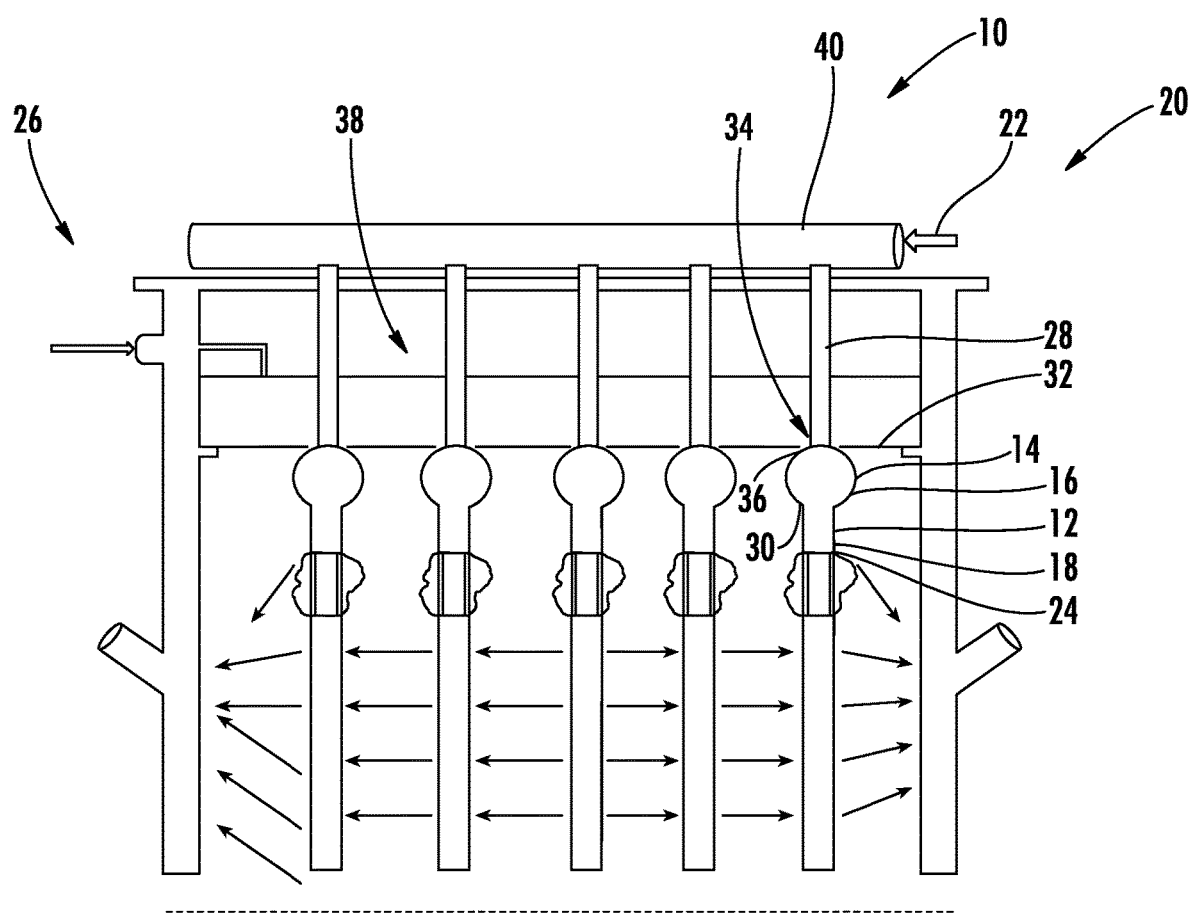
FIG. 2 is another schematic, side view of the heat and mass transfer system.

As shown in FIGS. 1-35, a heat and mass transfer system 10 configured to be a passive system using gravitational force to form a flow of thin liquid film 12 on an outer surface 14, 24 of an flow distribution head 16 and downstream conduit member 18 to subject the thin liquid film 12 to heat transfer mediums 22 is disclosed. The flow distribution head 16 may be formed from any shape capable of creating a liquid distribution on an outer surface 14, 24 of the flow distribution head 16. This configuration creates more efficient evaporation rates. In particular, in embodiments where the heat transfer medium passing within the downstream conduit 18 is steam, the steam is passed within the downstream conduit. The steam condenses and forms condensate droplets, which can form a film, on the inner surfaces of the downstream conduit 18, but the incoming steam forces the condensate droplets out of the downstream conduit 18, thereby preventing the condensate droplets from remaining on the inner surfaces and acting as an insulator. Thus, configuring the heat transfer medium, such as steam, to be passed through internal aspects of the downstream conduits 18 enhances the efficiency of the heat and mass transfer system 10 in comparison to conventional systems.

Figure 34:
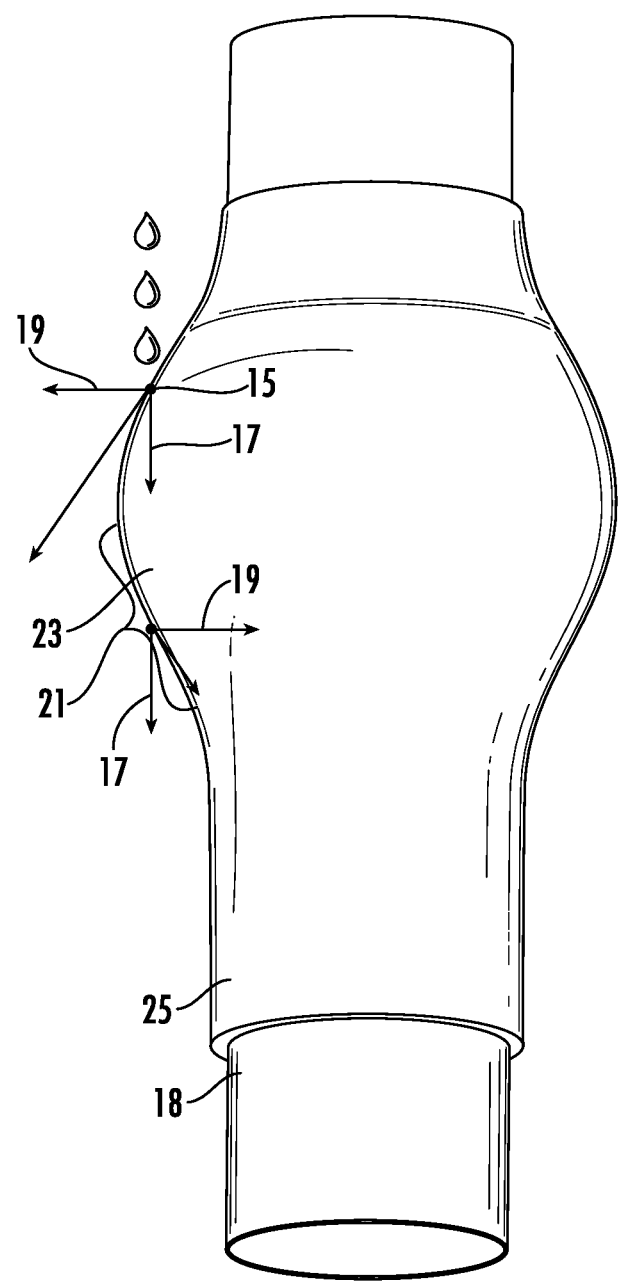
FIG. 34 is a side view of the flow distribution head of the heat and mass transfer system.

In at least one embodiment, the heat and mass transfer system 10 may be configured to create a uniform thin film layer of liquid on a surface 18 for heat transfer or mass transport, such as, but not limited to, evaporation. In at least one embodiment, the surface 18 for heat transfer or mass transport, such as, but not limited to, evaporation may be positioned below the flow distribution head 16. The flow distribution head 16 may be configured such that the portion, referred to as the contact portion 15, of the flow distribution head 16 onto which a feed fluid first contacts is curved and defined by two vectors, a first vector 17 pointing downward and a second vector 19 pointing radially outward, as shown in FIG. 34. The flow distribution head 16 may further be configured such that surfaces 23 within a transition portion 21 of the flow distribution head 16 includes a second vector 19 pointing in an opposite direction from the second vector 19 and including a first vector pointing downward. The flow distribution head 16 may be coupled at a terminal end 25 to the downstream conduit 18.

Figure 35:
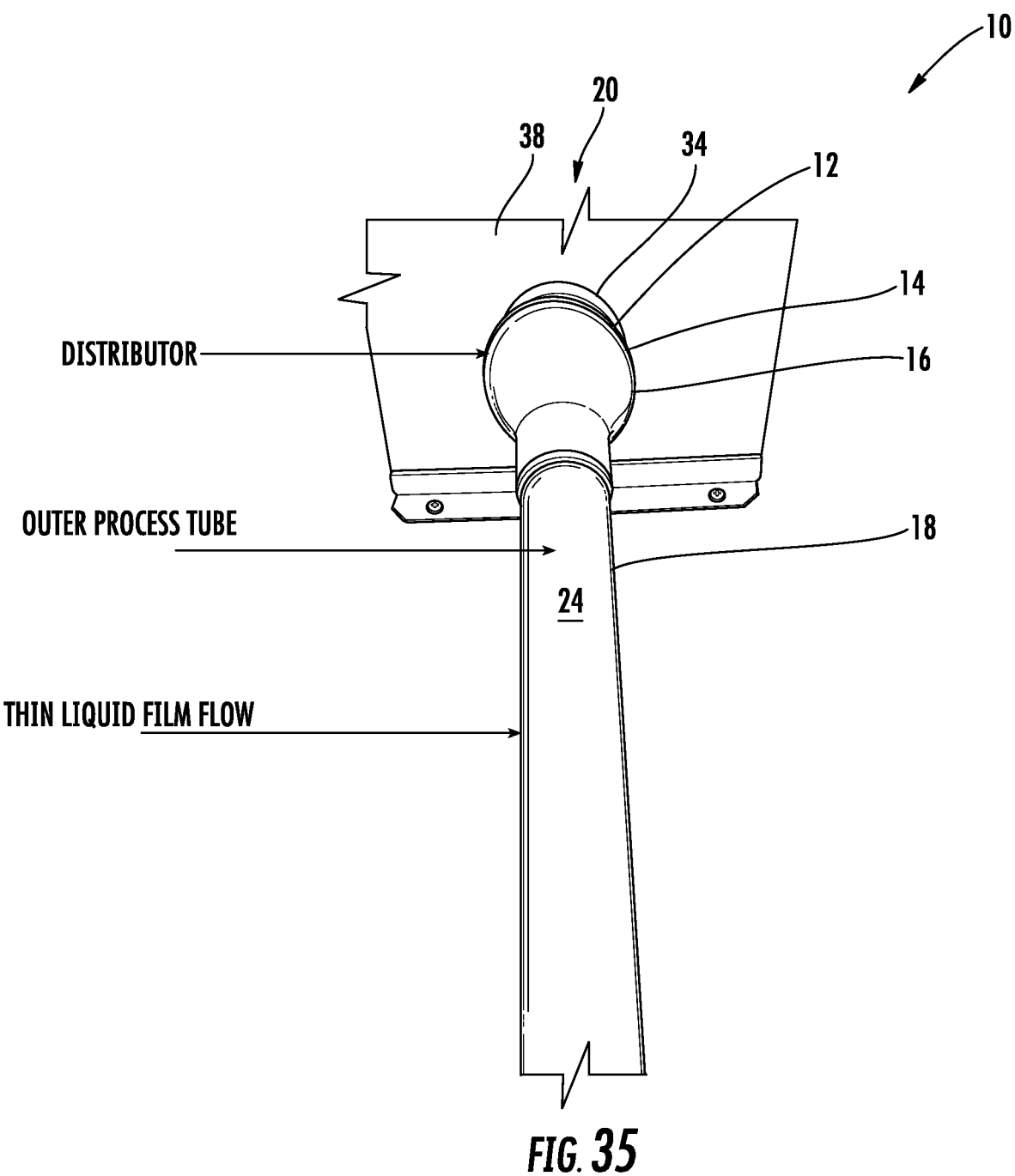
FIG. 35 is a perspective view of flow distribution head of the heat and mass transfer system when viewed upwardly from below the fluid containment vessel 38.

In at least one embodiment, the flow distribution head 16 may be at least partially spherical, as shown in FIG. 35. In other embodiments, the flow distribution head 16 may be any nonlinear surface, such as, but not limited to, a tapered surface, a curved surface, and the like. The flow distribution head 16 may create a uniform thin flow of liquid 12 on the outer surface 14 increasing the efficiency of the heat and mass transfer system 10. Rather than sheet flow on inner surfaces of a conduit, as done conventionally, the flow distribution head 16 enables sheet flow to be formed on an outside surface 14, 24, of a component 18, such as, but not limited to, a conduit, which may be, but is not limited to being, a tube. Most noteworthy, the flow distribution head 16 enables the sheet flow to be formed in a uniform manner on the outer surface 14 on the flow distribution head 16 and continuing on to a surface 24 attached to the flow distribution head 16.

The heat and mass transfer system 10 may include one or more heat transfer medium supply systems 20 in fluid communication with the downstream conduit 18 such that at least one heat transfer medium 22 is delivered to the downstream conduit 18 while the liquid film 12 flows on the outer surface 24 of the downstream conduit 18. During use, the downstream conduit 18 may maximize energy transfer from heat transfer fluids, such as, but not limited to, steam. The heat and mass transfer system 10 may include uniquely designed flow components that form a uniform distribution of the liquid film thereby creating a hydrodynamic environment suitable for efficient heat and mass transfer operations. The heat and mass transfer system 10 may include a number of salient features, including, but not limited to, a unique liquid distribution feature, specifically the flow distribution head 16, a liquid film 12 on outer surfaces 14, 24 of flow distribution head 16 and downstream conduit 18, a combination of laminar and turbulent flow of liquid created due to the sheet thickness and surface waves on the liquid film, no moving parts, corrosion resistant, maximizing energy transfer from steam, scaling prevention by design, modular configuration, thermal performance expected to be in excess of 90 percent, high surface area density—$m^2/m^3$ such as, but not limited to, 1,200 $m^2/m^3$, active surface without welded joints and easy servicability.

Figure 13:
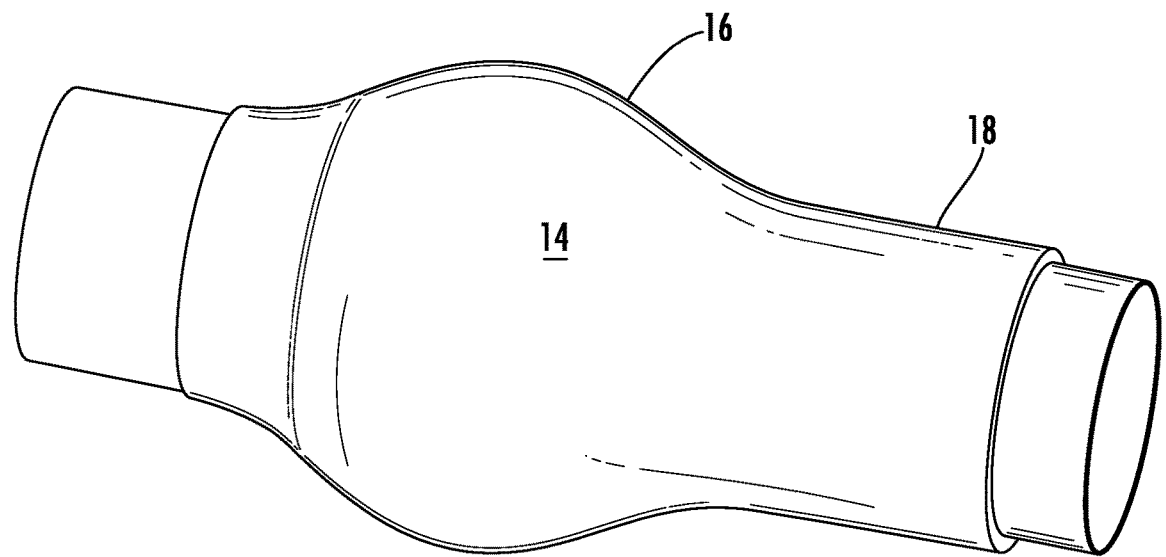
FIG. 13 is a perspective view the flow distribution head of the heat and mass transfer system.
Figure 14:
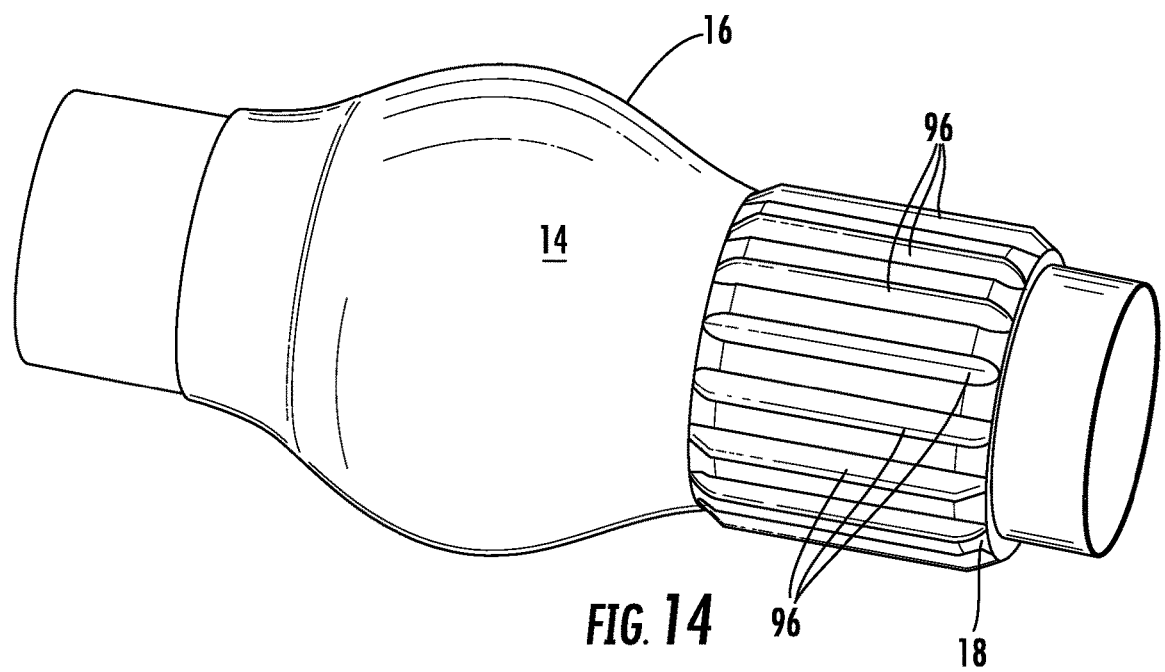
FIG. 14 is a perspective view of another embodiment of the flow distribution head of the heat and mass transfer system.

In at least one embodiment, the heat and mass transfer system 10 may include one or more flow distribution heads 16 having an at least partially spherical outer surface 16, as shown in FIGS. 13 and 14. The at least partially spherical outer surface 14 of the flow distribution head 16 may be profiled. The profiled outer surface 14 of the flow distribution head 16 may be profiled such that the surface is roughened, such as via sandblasting or other appropriate means. The profiled outer surface 14 may form a uniform thin flow of liquid film 12 onto the at least partially spherical outer surface 14 of the flow distribution head 16. Without the profiled outer surface 14, it is likely that a nonuniform flow would result. In other embodiments, the flow distribution head 16 is used without the outer surface 14 being profiled. The flow distribution head 16 may be formed from any appropriate materials, such as, but not limited to, stainless steel, carbon steel, copper nickel alloy, plastic PTFE and quartz (glass) and ceramic.

The heat and mass transfer system 10, as shown in FIGS. 1-13, may include one or more downstream conduits 18 that may extend downstream from the flow distribution head 16. The downstream conduits 18 may be positioned underneath the flow distribution head 16 such that gravity pulls the liquid from the flow distribution head 16 and onto the downstream conduit 18. As such, energy need not be expended to move the liquid from the flow distribution head 16 to the downstream conduit 18. Rather, the heat and mass transfer system 10 is configured as a passive system in which gravity pulls feed fluid from a fluid supply system 26 onto the flow distribution head 16 and further onto the downstream conduit 18.

The downstream conduit 18 may have an outer surface 24 with a width that is narrower than a widest width measurement of the flow distribution head 16, as shown in FIG. 34. In at least one embodiment, the downstream conduit 18 may be, but is not limited to being, a tube. In other embodiments, the downstream conduit 18 may have a cross-section with a shape, including, but not limited to, oval, elliptical, rectangle, square, or any other polygon. The downstream conduit 18 may be formed from any appropriate materials, such as, but not limited to, stainless steel, carbon steel, copper nickel alloy, plastic PTFE and quartz (glass) and ceramic. In at least one embodiment, the inner or outer surfaces 68, 24, or both, of the downstream conduit 18 (and possibly the flow distribution head 16) may be coated with a catalyst, such as, but not limited to $TiO_2$. In such configuration, the heat and mass transfer system 10 can do not only heat transfer but also chemical reactions for certain applications. In another embodiment, as shown in FIG. 14, the downstream conduit 18 may include vanes 96 for creating turbulence in downstream flow pattern.

The heat and mass transfer system 10 may include one or more heat transfer medium supply systems 20 in fluid communication with the downstream conduit 18 such that one or more heat transfer mediums 22 is delivered to the downstream conduit 18 while the liquid film 12 flows on the outer surface 24 of the downstream conduit 18. The heat transfer medium supply system 20 may include one or more conduits 28 extending into the flow distribution head 16 having an at least partially spherical outer surface 14. The conduit 28 of the heat transfer medium supply system 20 may extend into the flow distribution head 16 having an at least partially spherical outer surface 14 at a top 30 of the flow distribution head 16. The heat transfer medium 22 used in the heat transfer medium supply system 20 may be, but is not limited to being, air, such as hot or cold air, steam, water, such as hot or cold water, microwaves, radio frequency (RF) waves and ultraviolet radiation (UV) waves. The hot air or cold air may be defined based upon the temperature of the liquid film 12 that flows on the outer surface 24 of the downstream conduit 18. Hot air has a higher temperature than the liquid film 12 that flows on the outer surface 24 of the downstream conduit 18, and cold air has a lower temperature than the liquid film 12 that flows on the outer surface 24 of the downstream conduit 18. Similarly, hot water has a higher temperature than the liquid film 12 that flows on the outer surface 24 of the downstream conduit 18, and cold water has a lower temperature than the liquid film 12 that flows on the outer surface 24 of the downstream conduit 18.

Figure 5:
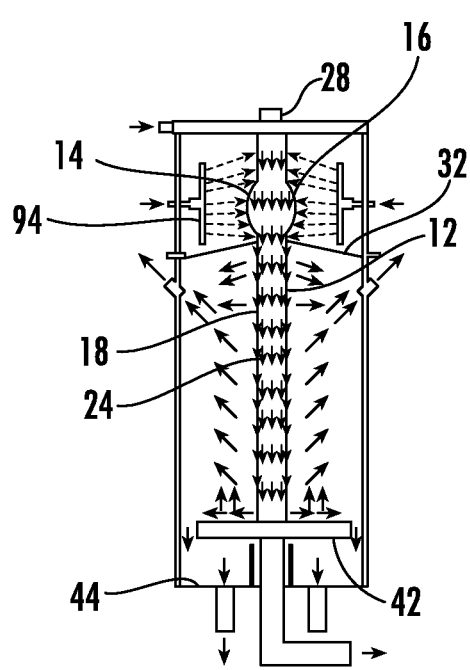
FIG. 5 is a schematic, side view of another embodiment of the heat and mass transfer system with a nozzle configured to spray liquid onto the flow distribution head to form a liquid film.
Figure 6:
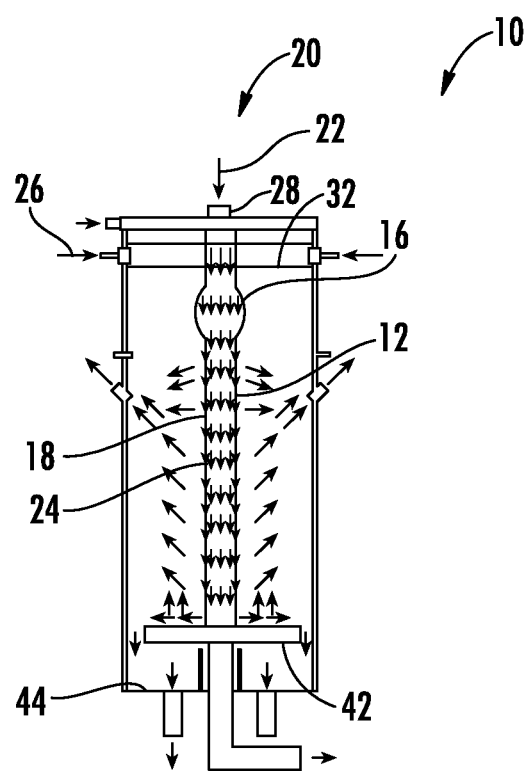
FIG. 6 is another schematic, side view of the heat and mass transfer system.

The heat and mass transfer system 10 may include one or more fluid supply systems 26 configured to release a liquid film 12 onto the at least partially spherical outer surface 14 such that the liquid film 12 flows on the at least partially spherical outer surface 14 and onto the at least one downstream conduit 18. In at least one embodiment, the fluid supply system 26 may include one or more fluid containment surfaces 32 having an annular shaped outlet 34 defined in part by the at least one conduit 28 of the heat transfer medium supply system 20 extending through the outlet 34. An outer diameter 36 of the annular shaped outlet 34 may be is less than the widest width measurement of the flow distribution head 16. The fluid supply system 26 may include one or more fluid containment vessels 38 for containing a supply fluid before being used to form a film 12 on the flow distribution head 16. In at least one embodiment, the fluid containment vessel 38 may be positioned above the flow distribution head 16 of the heat and mass transfer system 10. In another embodiment, as shown in FIG. 5, the fluid supply system 26 may include one or more nozzles 94 for spraying a liquid onto the flow distribution head 16 to form the liquid film 12.

In at least one embodiment, as shown in FIGS. 1-6, 8-10 and 12-14, the heat and mass transfer system 10 may include a plurality of flow distribution heads 16 having an at least partially spherical outer surface 14. The plurality of flow distribution heads 16 may be spaced from each other such that the flow distribution heads 16 or the fluid films 12 on the outer surface 14 of the flow distribution heads 16 do not contact each other. The heat transfer medium supply system 20 may include one or more conduits 28 extending into each one of the plurality of flow distribution heads 16 having an at least partially spherical outer surface 14. The heat transfer medium supply system 20 may include a supply manifold 40, as shown in FIGS. 1-4, 8 and 9, in communication each of a plurality conduits 28 extending to the flow distribution heads 16. The heat transfer medium supply system 20 may include an exhaust manifold 42, as shown in FIGS. 1-6, 8 and 9, in communication with each of a plurality of downstream conduits 18 extending downstream from each of the plurality of flow distribution heads 16.

The heat and mass transfer system 10 may include one or more fluid capture systems 44, as shown in FIGS. 1-4, 8 and 9, configured to capture the used liquid film 12 after the liquid film 12 has flowed over the flow distribution head 16 and the downstream conduit 18 extending downstream from the flow distribution head 16. The fluid capture system 44 may be formed from any appropriate size and shape, and, in at least one embodiment, may be a vessel.

Figure 3:
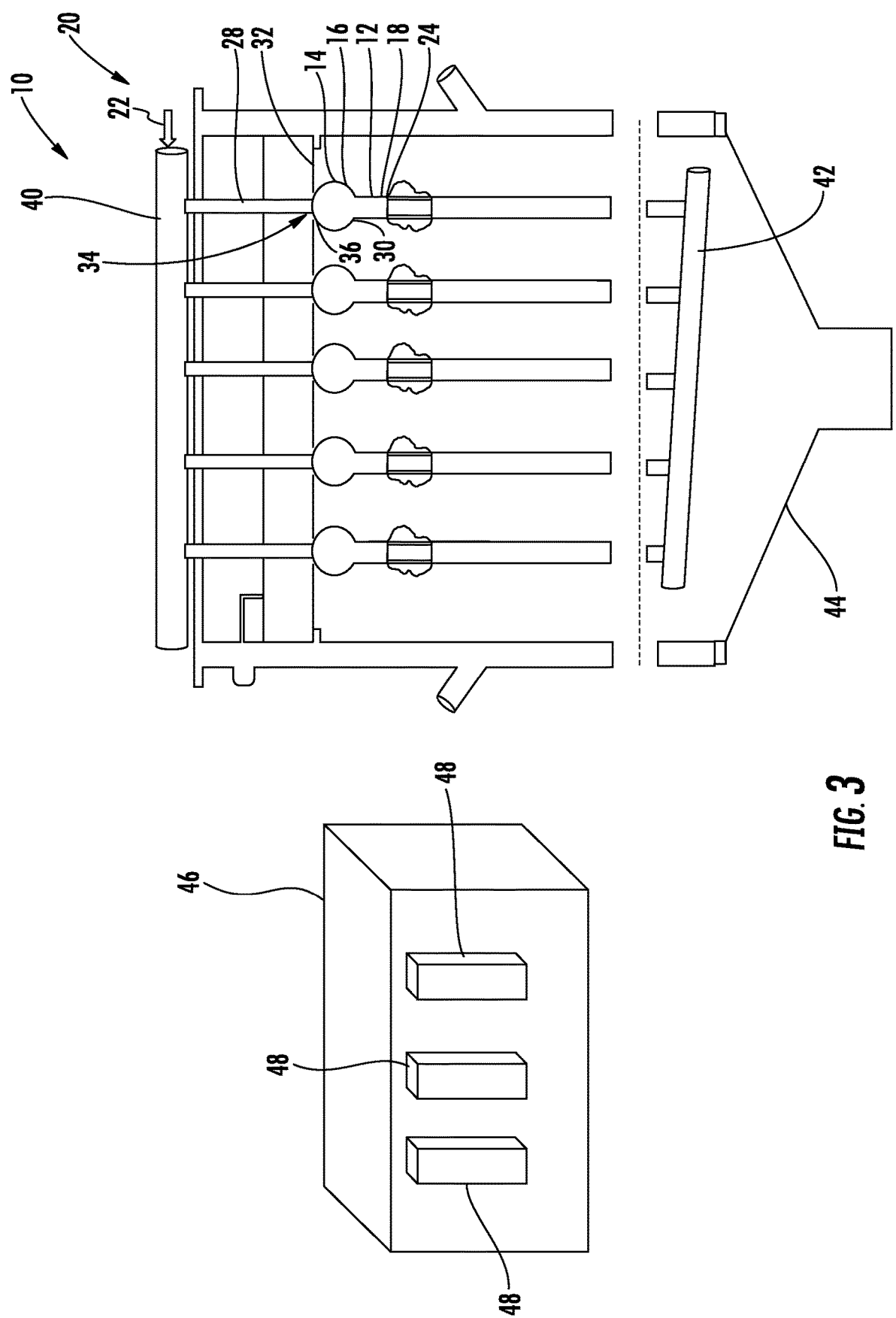
FIG. 3 is a schematic, side view of the heat and mass transfer system together with a heat and mass transfer system housing.

In at least one embodiment, as shown in FIG. 3, the heat and mass transfer system 10 may include a heat and mass transfer system housing 46 configured to contain the flow distribution head 16, the downstream conduit 18, the fluid supply system 26 and the heat transfer medium supply system 20. The heat and mass transfer system housing 46 may have any appropriate configuration, such as, but not limited to, cylindrical, rectangular and the like. In at least one embodiment, the heat and mass transfer system housing 46 may be formed from a conventional 40 foot long shipping container. In this exemplary embodiment, the shipping container may house subhousings 48.

Figure 4:
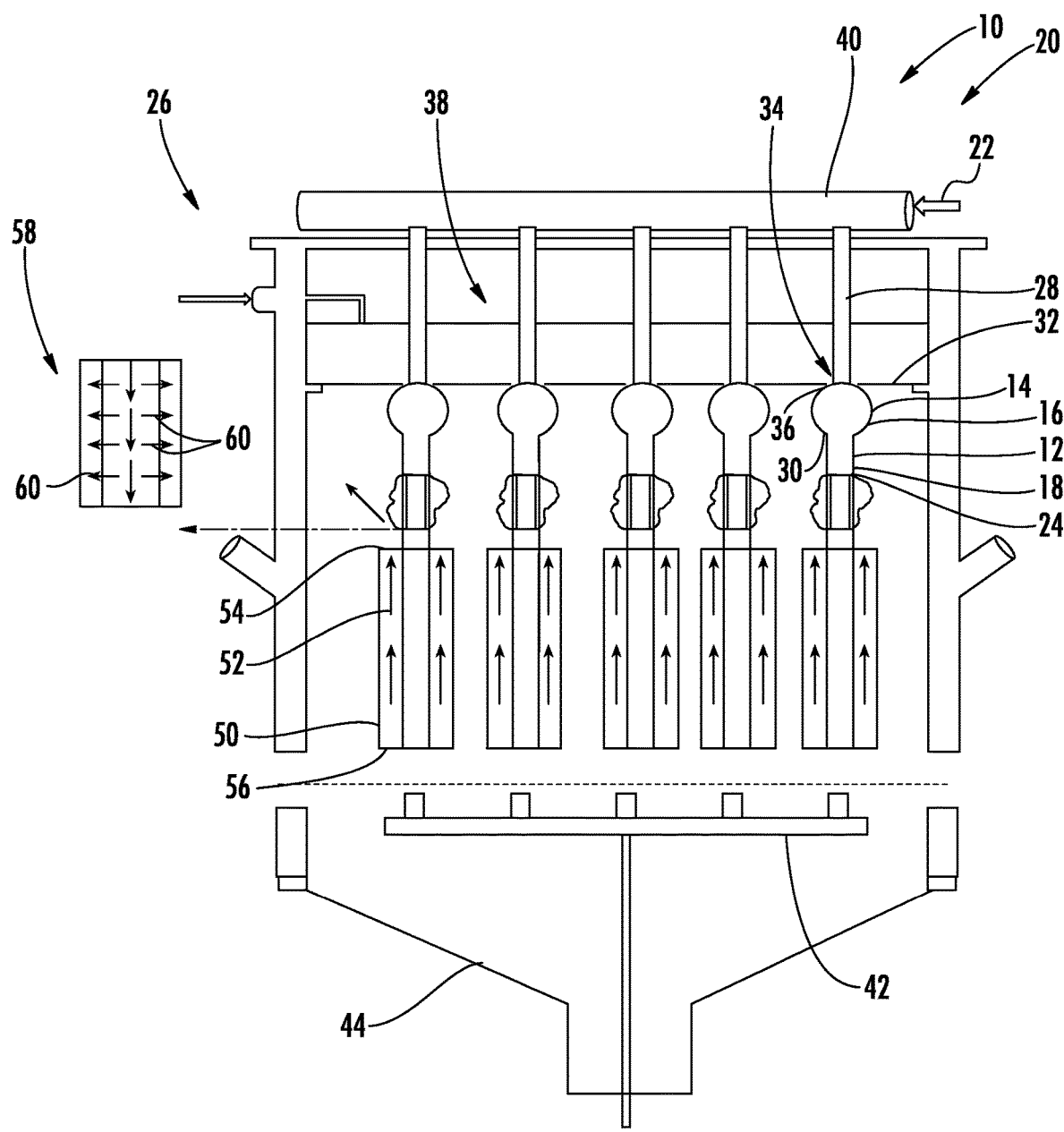
FIG. 4 is a schematic, side view of another embodiment of the heat and mass transfer system with an outer flow channel forming a counter current gas flow channel.

In at least one embodiment, as shown in FIG. 4, the heat and mass transfer system 10 may include an outer flow channel 50 configured to form a channel 50 around the outer surface 24 of the downstream conduit 18. The outer flow channel 50 may be configured to flow fluid that contacts the liquid film 12 on the outer surface 24 of the downstream conduit 18. The outer flow channel 50 may form a counter current gas flow channel 52 with an outlet 54 closer to the flow distribution head 16 than an inlet 56, as shown in FIG. 4. In another embodiment, the outer flow channel 50 may be configured with an inlet 56 closer to the flow distribution head 16 than an outlet 54. In at least one embodiment in which the downstream conduit 18 may be a cylindrical tube the outer flow channel 50 may be concentric with the downstream conduit 18.

The heat and mass transfer system 10 may include a self-cleaning system 58 configured to clean biomaterials from the outer surface 24 of the downstream conduit 18. The self-cleaning system 58 may include a plurality of holes 60 in the downstream conduit 18. The holes 60 may be sized such that substantially no fluid passes from inside the downstream conduit 18 due to surface tension except during periodic cleaning processes when the heat transfer medium 22 is pressured from inside the downstream conduit 18 through the plurality of holes 60 in the downstream conduit 18 to dislodge biomaterials on the outer surface 24 of the downstream conduit 18. As such, there is substantially no entrainment of liquid. The self-cleaning system 58 may be an in situ system that periodically shoots a gas, such as, but not limited to, air to clean biomats that form on the outer surface 24 of the downstream conduit 18 to prevent reductions in heat transfer and other problems caused by the biomats.

Figure 12:
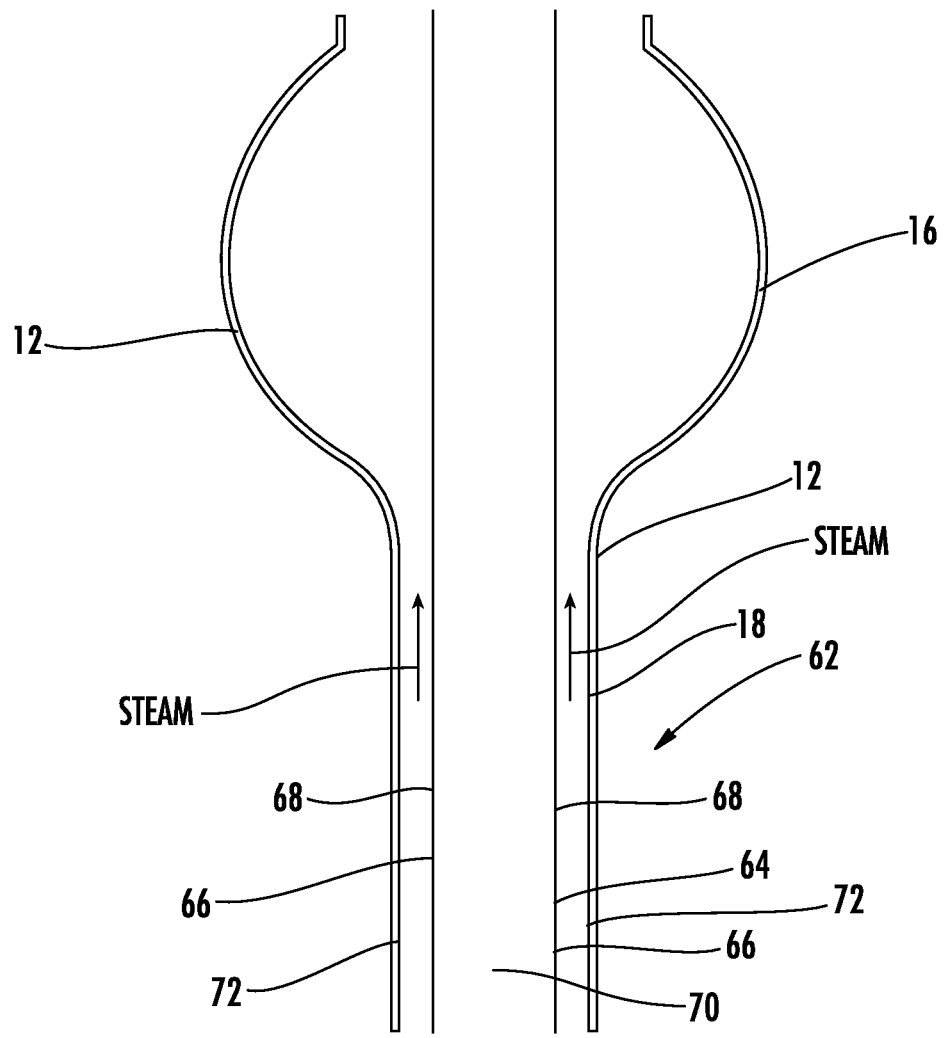
FIG. 12 is a schematic, side view of another embodiment of the heat and mass transfer system configured as condensation capture system.

The heat and mass transfer system 10 may also include a condensation capture system 62, as shown in FIG. 12, formed from one or more condensation capture conduits 64 positioned within the downstream conduit 18 extending downstream from the flow distribution head 16. In at least one embodiment with the condensation capture system 62, steam may flow between an outer surface 66 of the condensation capture conduit 64 and an inner surface 68 of the downstream conduit 18 extending downstream from the flow distribution head 16, and internal aspects 70 of the condensation capture conduit 64 may be a dead space. Condensation may form on an inner surface 68 of the wall forming the condensation capture conduit 64. At least a portion of the liquid film 12 flowing on the outside surface 72 of the downstream conduit 18 may evaporate. The liquid film 12 is highly efficient because the film 12 creates a small pathway because the film 12 is thin.

Figure 8:
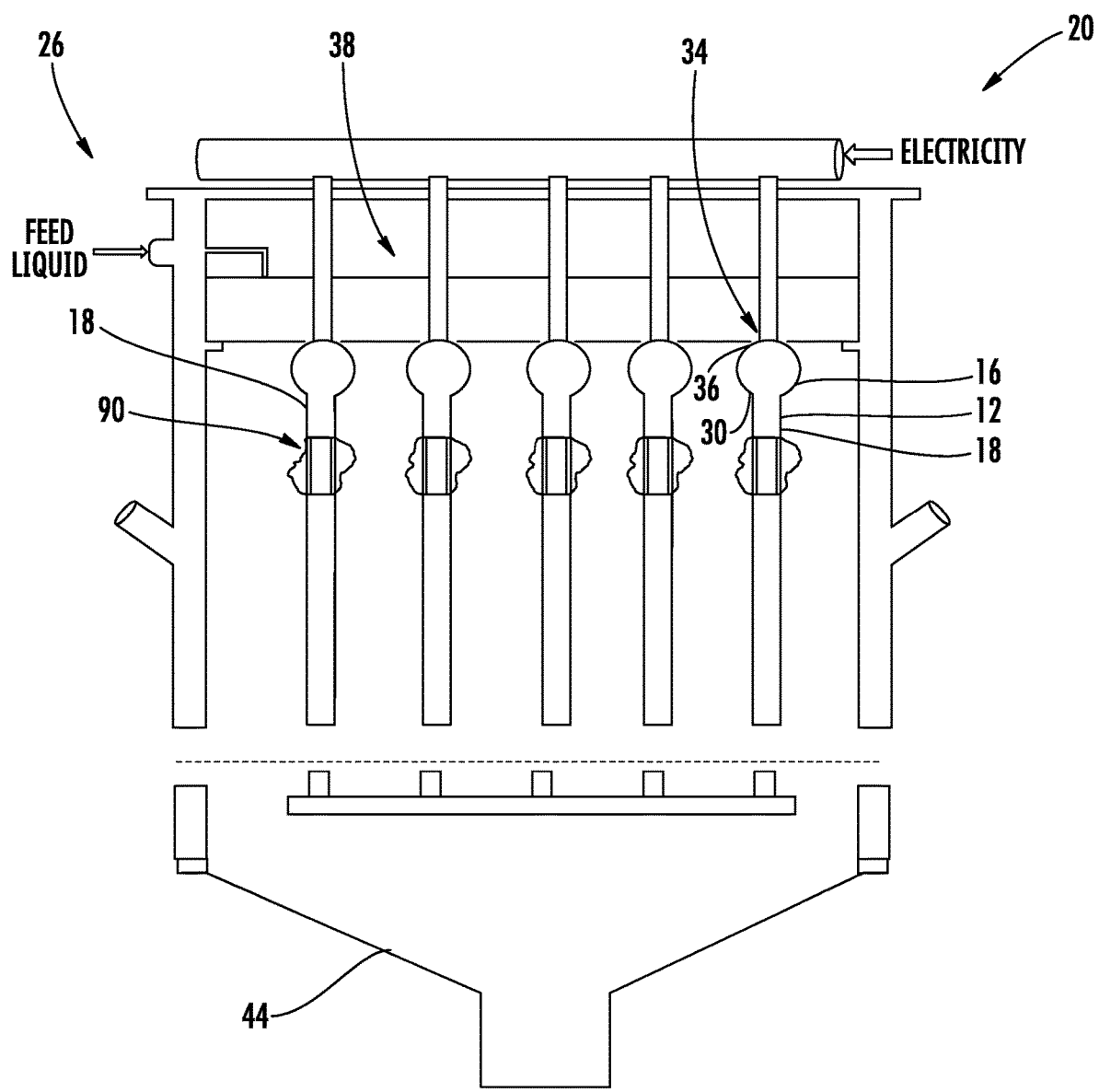
FIG. 8 is a schematic, side view of another embodiment of the heat and mass transfer system configured for an oxidation process using UV radiation.

In alternative embodiments of the heat and mass transfer system 10, as shown in FIG. 8, the downstream conduit 18 extending downstream from the flow distribution head 16 may be formed from quartz, such as, but not limited to a quartz tube, and coated with a catalyst, such as, but not limited to, titanium dioxide, titanium dioxide mesh or other catalyst. One or more ultraviolet (UV) lamps 90 or UV emitting light emitting diodes (LED) may be positioned within the quartz tubes 18. Because of the small thickness of the liquid film 12, it is expected that fluids with high turbidity can be effectively processed with UV. In an alternative embodiment, ultraviolet may be applied to a catalyst, such as, but not limited to, titanium dioxide.

Figure 9:
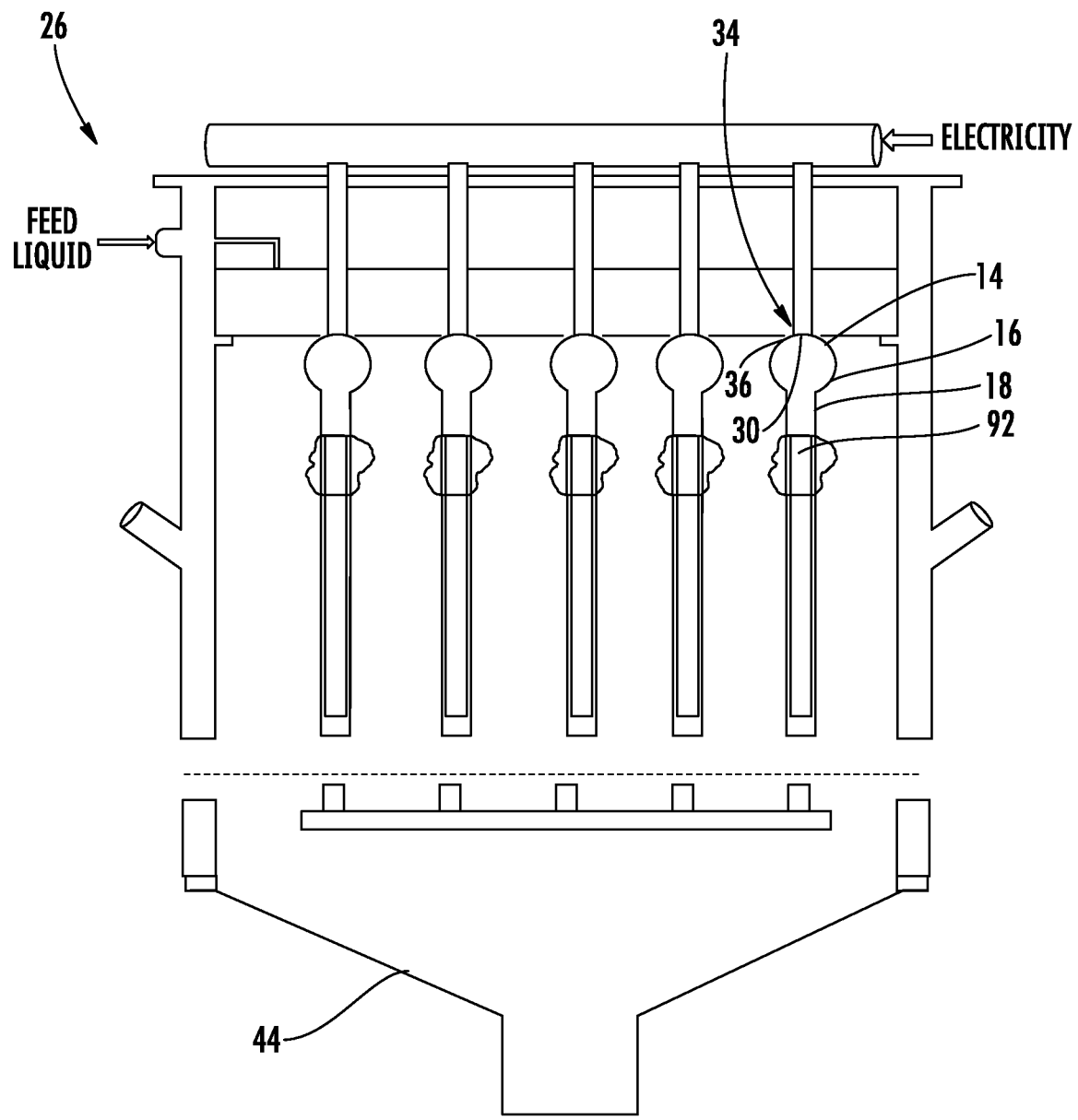
FIG. 9 is a schematic, side view of another embodiment of the heat and mass transfer system with a microwave system.
Figure 10:
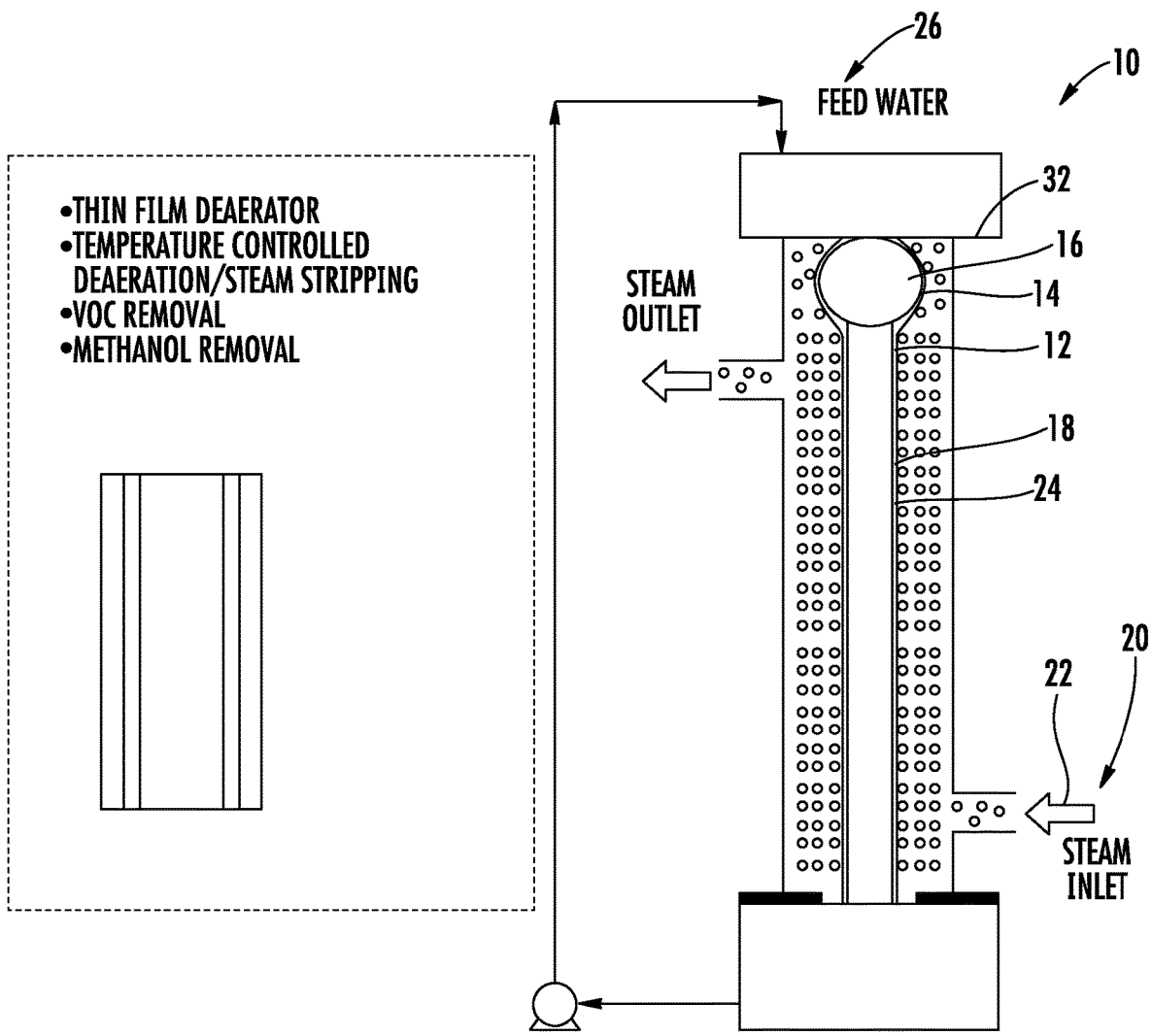
FIG. 10 is a schematic, side view of another embodiment of the heat and mass transfer system configured as a deaerator/steam stripper.

In another embodiment, as shown in FIG. 9, the downstream conduit 18 extending downstream from the flow distribution head 16 may be formed from PTFE, and microwave waveguides 92 may be positioned within the downstream conduit 18 for selective applications. The downstream conduit 18 may be a device configured to emit field effects, such as, but not limited to, microwaves from a tunable microwave reactor or ultraviolet radiation (UV). The heat and mass transfer system 10 may be configured to be a fine tuned microwave system to influence chemical reactions. As shown in FIG. 9, microwaves are generated by microwave waveguides 92 positioned within the downstream conduit 18. The microwaves may effectively penetrate the liquid film 12 because of the small thickness of the liquid film 12.

Figure 7:
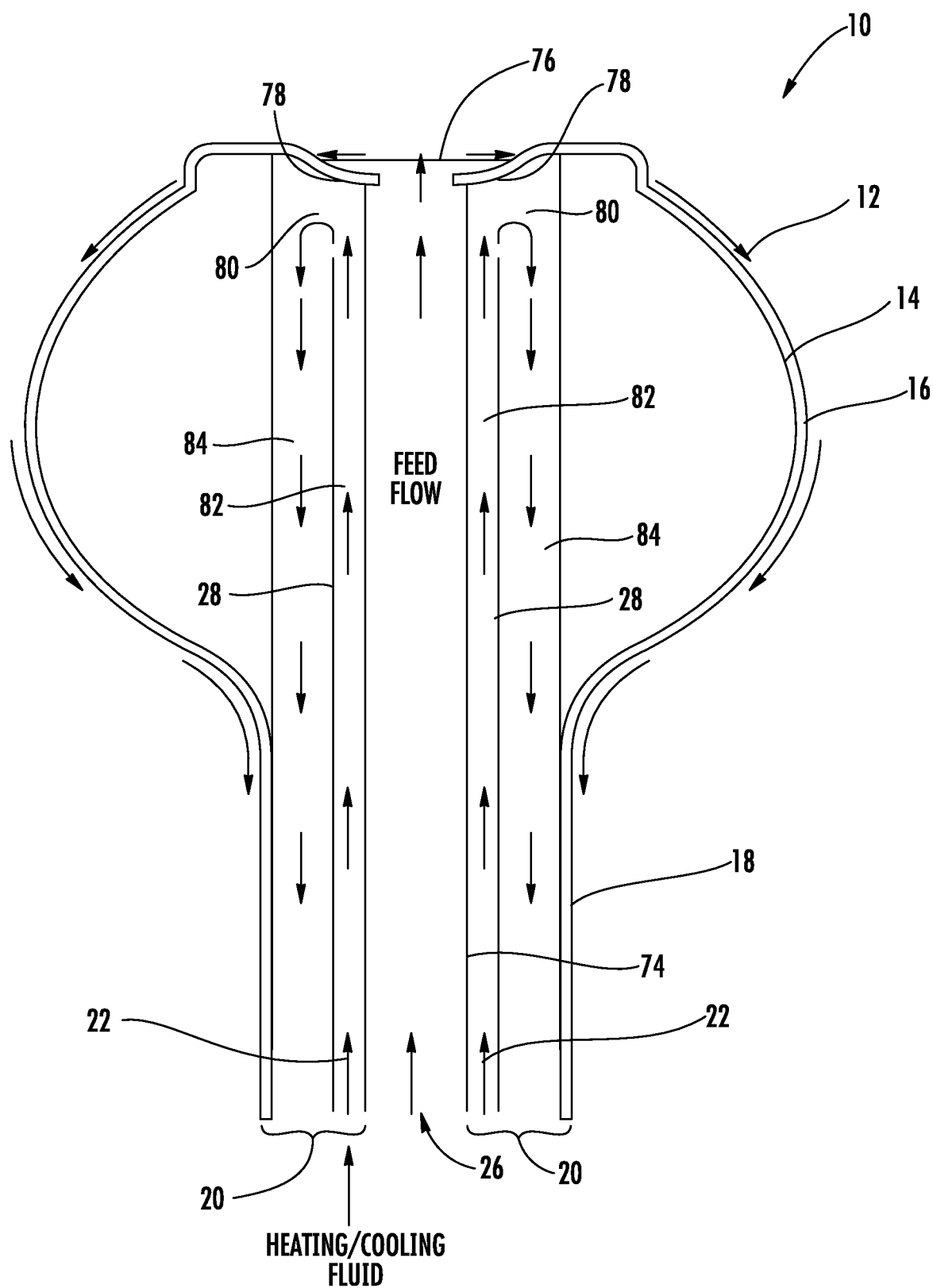
FIG. 7 is a schematic, side view of another embodiment of the heat and mass transfer system with an upward flowing fluid supply system that is exposed to the heat transfer medium supply system before being formed as a liquid film on the flow distribution head.

In another embodiment, as shown in FIG. 7, the fluid supply system 26 may be formed from one or more fluid supply conduits 74 positioned within the downstream conduit 18 and configured to supply fluid to a supply fluid pool 76 on an upper side of the flow distribution head 16. The heat transfer medium supply system 20 may be formed from one or more heat transfer medium supply conduits 28 that extend around the fluid supply conduit 74 and inside of the downstream conduit 18, whereby the heat transfer medium supply conduit 28 terminates short of a wall 78 forming the supply fluid pool 76 to form an outlet 80 between a first outward bound leg 82 of the heat transfer medium supply system 20 and a second inward bound leg 84 of the heat transfer medium supply system 20. The second inward bound leg 84 may be positioned radially outward of the first outward bound leg 82.

Figure 11:
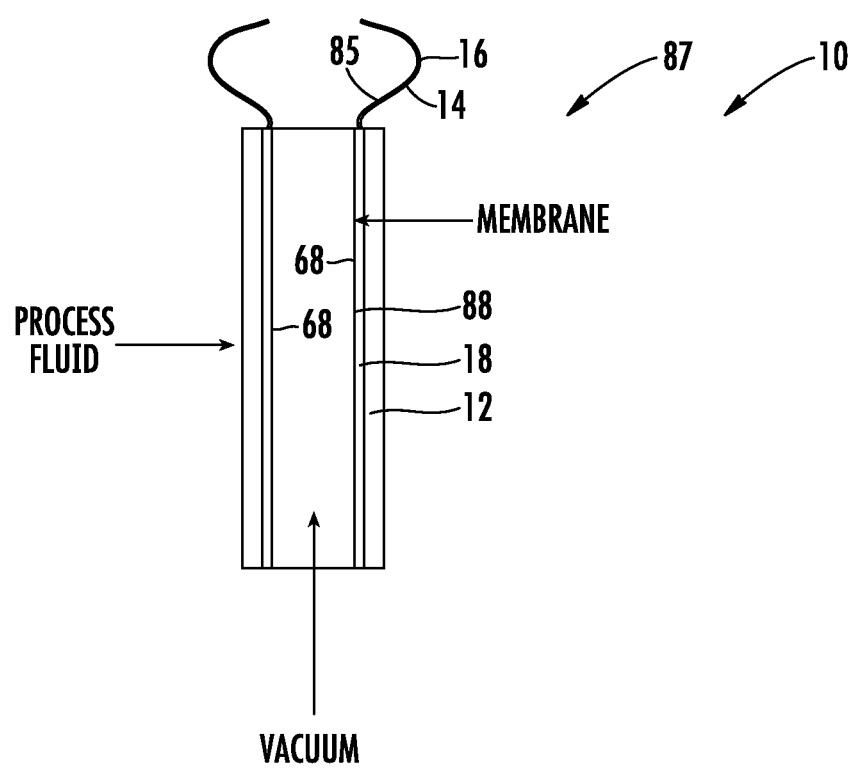
FIG. 11 is a schematic diagram of another embodiment of a portion of the heat and mass transfer system configured as a pervaporation system.

In yet another embodiment, as shown in FIG. 11, the heat and mass transfer system 10 may be configured to be a pervaporation system. The pervaporation system may be used to dehydrate organics. In at least one embodiment, the pervaporation system may include one or more flow distribution heads 16 having an at least partially spherical inner surface 14, whereby the flow distribution head 16 is hollow and configured to develop a liquid film 12 on an inner surface 85 of the flow distribution head 16. The heat and mass transfer system 10 may include one or more downstream conduits 18 extending downstream from the flow distribution head 18, whereby the downstream conduit 18 has an inner surface 68 with a width that is narrower than a widest width measurement of the inner surface 85 of the flow distribution head 16. The downstream conduit 18 may be hollow and may be formed from a membrane 88 with an active inner surface. The heat and mass transfer system 10 may include one or more fluid supply systems 26 configured to release a liquid film 12 onto the at least partially spherical inner surface 85 such that the liquid film 12 flows on the at least partially spherical inner surface 85 and onto the membrane 88 forming the downstream conduit 18. The heat and mass transfer system 10 may include one or more vacuum systems 87 configured to surround the downstream conduit 18 extending downstream from the flow distribution head 16 to pull fluid through the membrane 88 forming the downstream conduit 18.

Figure 15:
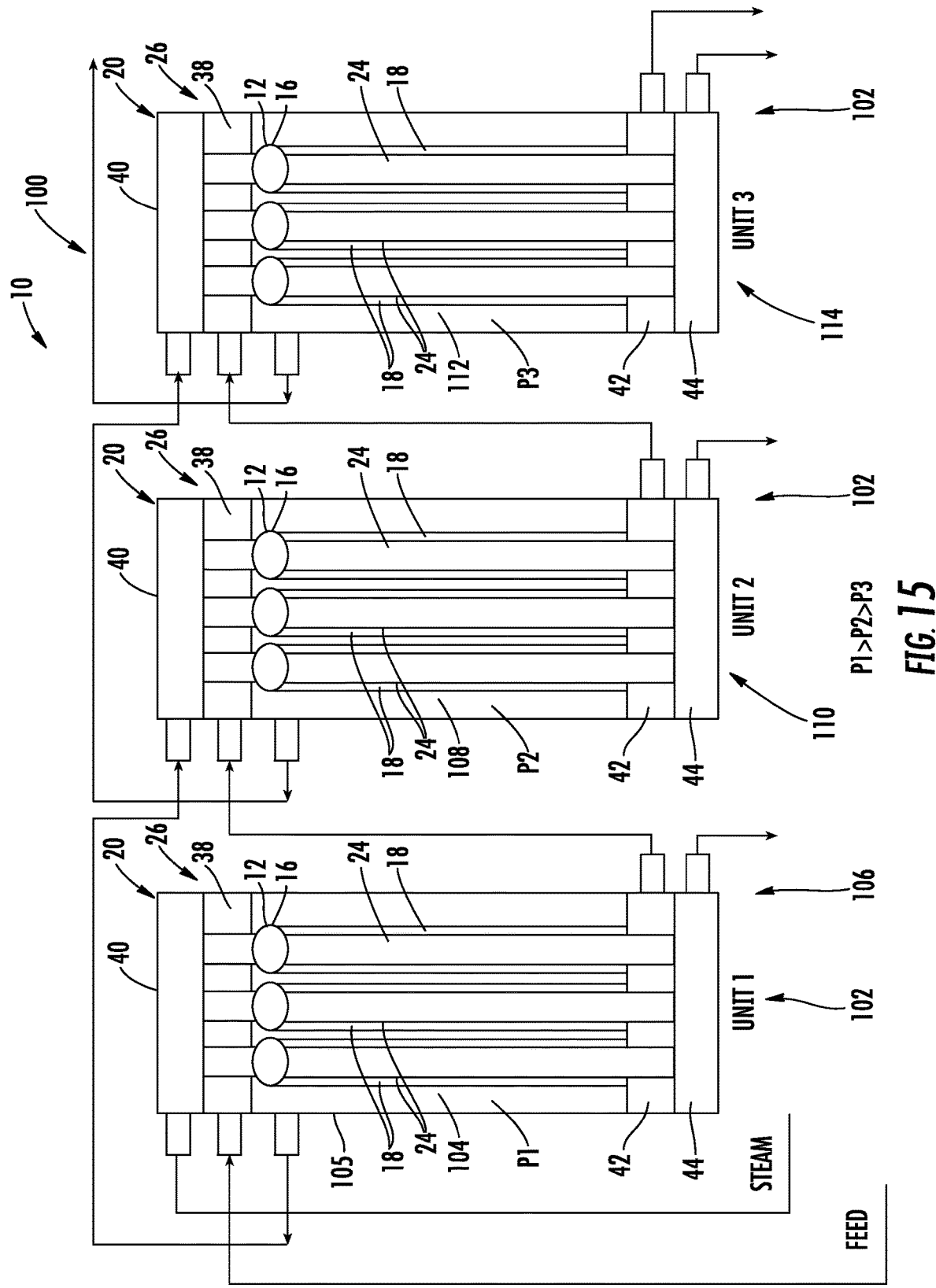
FIG. 15 is a schematic, side view of an application of the heat and mass transfer system in which the system is configured as a multi-effect evaporation system.

In another embodiment, as shown in FIG. 15, the heat and mass transfer system 10 may be configured to be a multi-effect evaporation system 100. The multi-effect evaporation system 100 may be configured such that two or more units 102 may be coupled together to deliver multi effect evaporation capabilities. A unit 102 may be defined as including, but not limited to, one or more of the following, a flow distribution head 16, a downstream conduit 18 extending downstream from the flow distribution head 16, and a heat transfer medium supply system 20 in fluid communication with the downstream conduit 18 such that one or more heat transfer mediums 22 is delivered to the downstream conduit 18 while the liquid film 12 flows on the outer surface 24 of the downstream conduit 18. Multi-effect evaporation may be used to achieve higher process and energy efficiencies not just for evaporation duties but also during crystallization operations such as crystallizations of calcium chloride and sodium chloride salts from various feed stocks including the brine generated from oil and gas production processes such as produced and flow back waters.

As shown in FIG. 15, the multi-effect evaporation system 100 may be formed from two or more units 102, and in at least one embodiment, may be formed from three units 102 to achieve the benefits of multi-effect evaporation. The multi-effect evaporation system 100 is unique because the multi-effect evaporation system 100 does not require an external heat exchanger to pre-heat the feed liquid. Instead, the multi-effect evaporation system 100 uses vapor from the previous stage to heat the feed liquid. As such, the supply manifold 40 for the heat transfer medium supply system 20 and the fluid containment vessel 38 function, in part, as an integral heat exchanger in the multi-effect evaporation system 100 and provides a surface area where both heat transfer and crystallization process can occur simultaneously inside the crystallizer vessel. In this configuration, each unit 102 moving downstream will operate at a lower pressure. For example, a first vapor generation chamber 104 formed in part by a first shell 105 in a first unit 106 may operate at an operating pressure of P1, which may be greater than an operating pressure, P2, of a second vapor generation chamber 108 formed in part by a second shell 109 in a second unit 110. A second vapor generation chamber 108 in the second unit 110 may operate at an operating pressure of P2, which may be greater than an operating pressure, P3, of a third vapor generation chamber 112 formed in part by a third shell 113 in a third unit 114. In at least one embodiment, the pressure of P1 in the first unit 102 may be equal to atmospheric pressure, and the pressures P2 and P3 in the second and third vapor generation chambers 104, 108 of the second and third units 110, 114, respectively may be under vacuum. For example, P1>P2>P3; P1=Atmospheric pressure, P2=100 Torr, and P3=50 Torr. The vacuums may be created via one or more pumps or other appropriate devices.

The first, second and third units 106, 110, 114 may be configured as previously set forth. Steam may be supplied to a supply manifold 40 for the heat transfer medium supply system 20 of the first unit 106. The supply manifold 40 may be in fluid communication with the downstream conduit 18 and the fluid capture system 44. A fluid supply system 26 may include one or more fluid containment vessels 38 for containing a supply fluid before being used to form a film 12 on the flow distribution head 16. The downstream conduit 18 may pass into an exhaust manifold 42 such that fluid forming a film 12 on the outer surface 24 of the downstream conduit 18 may be collected in the exhaust manifold 42.

During use, steam may be provided to the supply manifold 40 for the heat transfer medium supply system 20 of the first unit 106. A feed fluid may be provided as feed to the fluid containment vessel 38. As the feed fluid passes onto the flow distribution heads 16 forming thin, fluid films, such as, but not limited to, uniform, thin fluid films, the fluid films flow down the outer surfaces 24 of the downstream conduits 18 via gravity and collect in the exhaust manifold 42. The feed fluid flowing on the outer surfaces 24 of the downstream conduits 18 is heated by the steam passing through interior aspects of the downstream conduit 18, and a portion of the fluid becomes vapor (under atmospheric pressure) is passed to the supply manifold 40 of the second unit 110 and into the downstream conduits 18 to form a heating component within the second unit 110. Heated fluid collected in the exhaust manifold 42 is passed as supply fluid to the fluid supply system 26 of the second unit 110. Due to the uniqueness of the design, the vapor from the first unit 106 enters the second vapor generation chamber 108 of the second unit 1120 within the downstream conduits 18 and flows down through the downstream conduits 18 (which may be heating tubes), whereby the vapor relieves heat to the process fluid flowing along the outer surface 24 of the downstream conduits 18. The vapor after relieving its heat exits the second unit 110 in a liquid form.

The shell side of the second unit 110, which is the side of the system 100 contained within the second shell 109 where the process fluid (feed liquid) flows along the outer surfaces 24 of the downstream conduits 18, which may be, but are not limited to being tubes, from top to bottom by gravity, is maintained under vacuum. The level of vacuum is maintained at such a level that at the temperature of the heating vapor flowing inside the heated downstream conduits 18, the feed liquid running down the outer surfaces 24 of the heated downstream conduits 18 evaporates.

The process described in relation to the first and second units 106, 110 is generally replicated in connection with the relationship between the second and third units 110, 114. Vapor generated in the second vapor generation chamber 108 may enter the heating side of the third unit 114, and in particular, may be passed into the supply manifold 40 of the third unit 114 and into the downstream conduits 18 to form a heating component within the second unit 110. The vapor within the downstream conduits 18 in the third unit 114 provides the heating source for further evaporation to take place in the third unit 114. Film fluid on the outer surfaces 24 of the downstream conduits 18 that does not turn to vapor in the first, second and third vapor generation chambers 104, 108 and 112 collects as a liquid in the exhaust manifolds 42, which function as steam traps. The reject liquid, which concentrate from each unit, 106, 110, 114 is used as the feed supply for subsequent units 102. The concentrate entering each unit 102 is hot and therefore requires very little or negligible heating in order to go through the evaporation process. This configuration and geometry of the multi-effect evaporation system 100 allows the operation to be extremely energy efficient.

Figure 16:
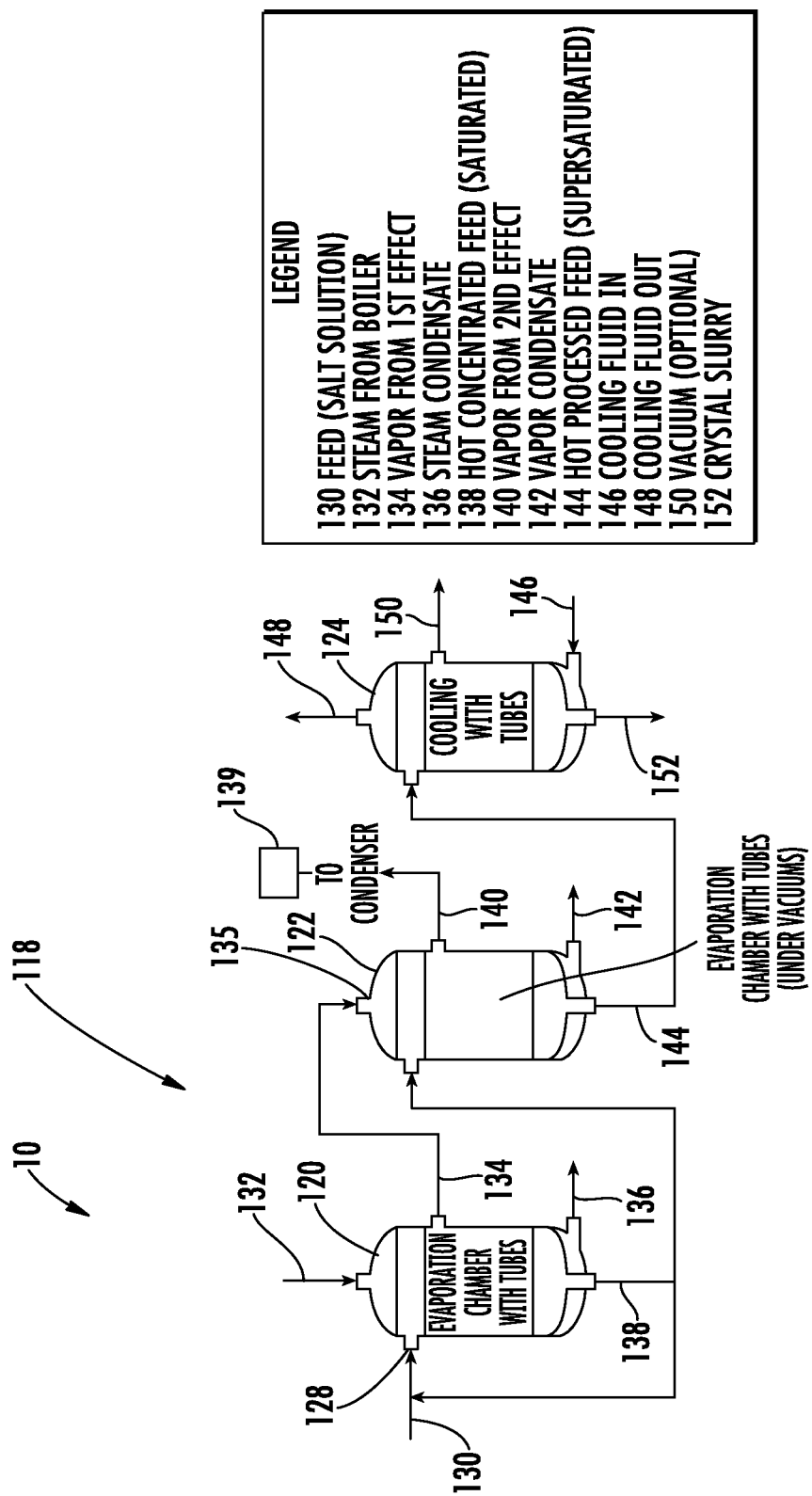
FIG. 16 is a schematic, side view of an application of the heat and mass transfer system in which the system is configured as a multi-effect crystallizer system.

As shown in FIG. 16, the heat and mass transfer system 10 may be configured as a multi-effect crystallizer system 118 to influence a crystallization process in a controlled manner. The multi-effect crystallizer system 118 may create a supersaturated solution and relieve the supersaturated solution in a controlled manner thereby influencing the crystal growth, crystal size and size distribution of the crystals (salts). The multi-effect crystallizer system 118 may be formed from a first unit 120 configured similarly to the first unit 106 shown in the multi-effect evaporation system 100 in FIG. 15 and a second unit 122 configured similarly to the second unit 110 shown in the multi-effect evaporation system 100 in FIG. 15. In at least one embodiment, the first and second units 120, 122 may include the same components shown in the first and second units 106, 110 of the multi-effect evaporation system 100 in FIG. 15.

The multi-effect crystallizer system 118 may also include a third unit 124 configured to function as a cooler, as shown in FIGS. 17 and 18. In FIG. 17, the cooling unit 124 functions with the use of a coolant. As shown in other figures of the heat and mass transfer system 10, the feed fluid, which may be, but is not limited to being, a supersaturated fluid, may be provided to the fluid supply system 26, from the fluid supply system 26 to the fluid containment vessel 38 and the fluid containment vessel 38 to the flow distribution heads 16 where the feed fluid is cooled. After passing over the flow distribution heads 16 and the downstream conduits 18, the supersaturated fluid becomes crystal slurry that is exhausted from the cooling unit via conduit 152. The coolant may be passed through the cooling unit 124 in a counter flow direction or a co-current flow direction. In a co-current flow direction, the coolant is passed into the heat transfer medium supply system 20 at conduit 148, and more specifically to the supply manifold 40, into the downstream conduits 18, collected in the exhaust manifold 42, and exhausted via conduit 146. In counter flow configurations, the passage of coolant through the cooling unit 124 is reversed, as shown in FIG. 17.

As shown in FIG. 18, the cooling unit 124 may function with a vacuum. In particular, the cooling unit 124 may be configured as a vapor generation chamber 154, such as the third vapor generation chamber 112 in FIG. 16. The vacuum may be generated via one or more vacuum ports 156 that may be coupled to a vacuum source, such as, but not limited to, a vacuum. As shown in other figures of the heat and mass transfer system 10, the feed fluid, which may be, but is not limited to being, a supersaturated fluid, may be provided to the fluid supply system 26, from the fluid supply system 26 to the fluid containment vessel 38 and the fluid containment vessel 38 to the flow distribution heads 16 where the feed fluid is cooled. After passing over the flow distribution heads 16 and the downstream conduits 18 and being cooled via the evaporation of some of the feed fluid due to the vacuum within the vapor generation chamber 154, the supersaturated fluid becomes crystal slurry that is exhausted from the cooling unit via conduit 152.

The heat and mass transfer system 10 configured as a multi-effect crystallizer system 118 with multiples of heat transfer tubes, such as downstream conduits 18, can be internally cooled while providing a high surface area density (in excess of 1000 $m^2/m^3$), which is a significant differentiating factor in comparison to conventional crystallizers. The ability of the multi-effect crystallizer system 118 to cope with hot solutions with very high total dissolved solids (TDS) content without scaling is significant. This ability enables the multi-effect crystallizer system 118 to achieve a high evaporation rate to produce a saturated/supersaturated solution collected in the exhaust manifolds 42 via gravity under the outer surfaces 24 of the downstream conduits 18. The saturated/supersaturated solution collected in the exhaust manifolds 42 can then be cooled in a controlled manner using a unit 102 either under vacuum on the shell side, such as in first, second, or third vapor generation chambers 104, 108, 112 or using heat transfer coolant fluid in the downstream conduits 18, or a combination of both vacuum and heat transfer coolant, which in most cases can be the process feed solution supplied by the heat transfer medium supply system 20 for achieving high overall thermal efficiencies. The multi-effect crystallizer system 118 is ideally configured for crystallization processes because the multi-effect evaporation system 100 can provide an energy efficient route to produce crystals, such as, but not limited to, salts, in a controlled manner. Salts including, but not limited to, calcium chloride, sodium chloride and magnesium chloride, can be produced using the multi-effect crystallizer system 118 using a variety of feedstock in the heat transfer medium supply system 20 such as, but not limited to, industrial waste water with salts, produced or flow back water with salts, and sea water.

During use, a feed fluid, such as, but not limited to, a salt fluid may be provided at inlet 128 from feed source 130. A heating fluid, such as, but not limited to, steam, such as from a boiler may be supplied at 132 to the heat transfer medium supply system 20 contained within the first unit 120. The heating fluid may be passed into the first unit 120 via the heat transfer medium supply system 20 and into the downstream conduits 18. Simultaneously, the feed fluid may be provided to the fluid supply system 26, from the fluid supply system 26 to the fluid containment vessel 38 and the fluid containment vessel 38 to the flow distribution heads 16 where the feed fluid is heated. A portion of the feed fluid that is heated evaporates and forms a vapor that is captured within the shell and exhausted from an outlet into conduit 134 to be passed to the second unit 120 as feed for the heat transfer medium supply system 20 and into the downstream conduits 18 in the second unit 120. The remainder of the feed fluid collects in the exhaust manifold 42 as a saturated fluid and is exhausted via conduit 138 and used as feed for the second unit 122 or returned to the feed supply for the first unit 120, or both.

In the second unit, the second vapor generation chamber 108 surrounding the downstream conduits 18 is operated at a pressure that is less than the operating pressure found in the first vapor generation chamber 104 of the first unit 120. In at least one embodiment, the second vapor generation chamber 108 surrounding the downstream conduits 18 is operated in a vacuum. The heated vapor is received at inlet 135 from conduit 134 and passed to the heat transfer medium supply system 20 and into the downstream conduits 18 contained within the second unit 122. Simultaneously, the feed fluid may be provided to the fluid supply system 26 via conduit 138 exhausted from the first unit 120, from the fluid supply system 26 to the fluid containment vessel 38 and the fluid containment vessel 38 to the flow distribution heads 16 where the feed fluid is heated. A portion of the feed fluid that is heated evaporates and forms a vapor that is captured within the shell and exhausted from an outlet into conduit 140 to be passed to a condenser 139. The remainder of the feed fluid collects in the exhaust manifold 42 as a supersaturated fluid and is exhausted via conduit 144 and used as feed for the cooling unit 124.

In the cooling unit 124, the supersaturated feed fluid is feed into the fluid supply system 26 via conduit 144 exhausted from the second unit 122, from the fluid supply system 26 to the fluid containment vessel 38 and the fluid containment vessel 38 to the flow distribution heads 16 where the feed fluid is cooled. The cooling unit 124 may function based solely upon a vacuum created within the shell surrounding the flow distribution heads 16 and the downstream conduits 18, as shown in FIG. 18, or via cold fluid flowing through the heat transfer medium supply system 20, including the downstream conduits 18 contained within the cooling unit 124, as shown in FIG. 17. In at least one embodiment, a cooling fluid, which is a fluid having a temperature less than a temperature of the feed fluid provided via conduit 144, may be provided via conduit 146. The cooling fluid may flow through internal aspects of the downstream conduits 18 in a counter flow direction or in a co-current flow direction. The cooling fluid may reduce the temperature of the supersaturated fluid flowing on the outer surfaces 24 of the downstream conduits 18 when the cooling fluid is passed through a conduit defined within the downstream conduit 18. The cooling fluid may be exhausted via conduit 148. After being cooled by flowing on the outside of the flow distribution heads 16 and downstream conduit 18, the supersaturated fluid forms a crystal slurry and is exhausted from the cooling unit 124 via conduit 152.

The multi-effect crystallizer system 118 may also be used extremely effectively to achieve zero liquid discharge (ZLD) concepts in process plants. Reject from membranes or filtration systems can be further processed in the proposed thermal systems to produce a reject with high solids content and the resulting vapor can be condensed to liquid and reused in the process plant. This concept is particularly relevant in dealing with the waste in power plants.

For crystallization processes and in situations where the liquid feed stream may have suspended solids, a more robust configuration is shown in FIGS. 19 and 20. In particular, as shown in FIG. 19, the flow distribution head 14 may include a feed containment pool 158 having an opening 160 through which a fluid supply conduit 162 may be received. The fluid supply conduit 162 may have an outer diameter less than the size of the opening 160 so that feed fluid is able to overflow from the feed containment pool 158 onto the outer surface 14 of the flow distribution head 16. A distal end 164 of the fluid supply conduit 162 may terminate below the opening 160 or, in other words, within the feed containment pool 158. When feed fluid enters the feed containment pool 158, suspended solids collect at the bottom of the feed containment pool 158. As the feed containment pool 158 is filled, feed fluid flows out of the opening 160 and onto the outer surface 14 of the flow distribution head 16. As such, the suspended solids do not clog, inhibit, prevent or restrain the feed fluid from flowing out of the opening 160 and onto the outer surface 14 of the flow distribution head 16. In at least one embodiment, the feed containment pool 158 may be generally spherical, such as having cup shaped internal configuration, which may create manufacturing advantages.

FIG. 20 discloses another embodiment configured to account for fluids with suspended solids. In particular, the flow distribution head 14, feed containment pool 158, opening 160 and fluid supply conduit 162 are as described in connection with FIG. 19. In addition, a feed fluid containment vessel 166 may be positioned inline in the fluid supply system 26 such that the feed fluid containment vessel 166 supplies fed fluid to the fluid supply conduit 162. The feed fluid containment vessel 166 is also configured to enable suspended solids to settle out of the feed fluid and collect within the feed fluid containment vessel 166 to prevent clogging and fouling of downstream components. The feed fluid containment vessel 166 may have any appropriate configuration enabling the feed fluid containment vessel 166 to contain fluids. An inlet 168 of the fluid supply conduit 162 may be positioned above a bottom surface 170, thereby enabling feed fluid to fill the feed fluid containment vessel 166 up to the height of the inlet 168. The feed fluid will enter the inlet 168 once the level of feed fluid in the feed fluid containment vessel 166 is greater than the inlet 168. This configuration causes suspended solids to settle out of the feed fluid and into the feed fluid containment vessel 166. This configuration is also suitable for cleaning the distributor sections, such as the fluid containment vessels 38, of the fluid supply systems 26.

Figure 21:
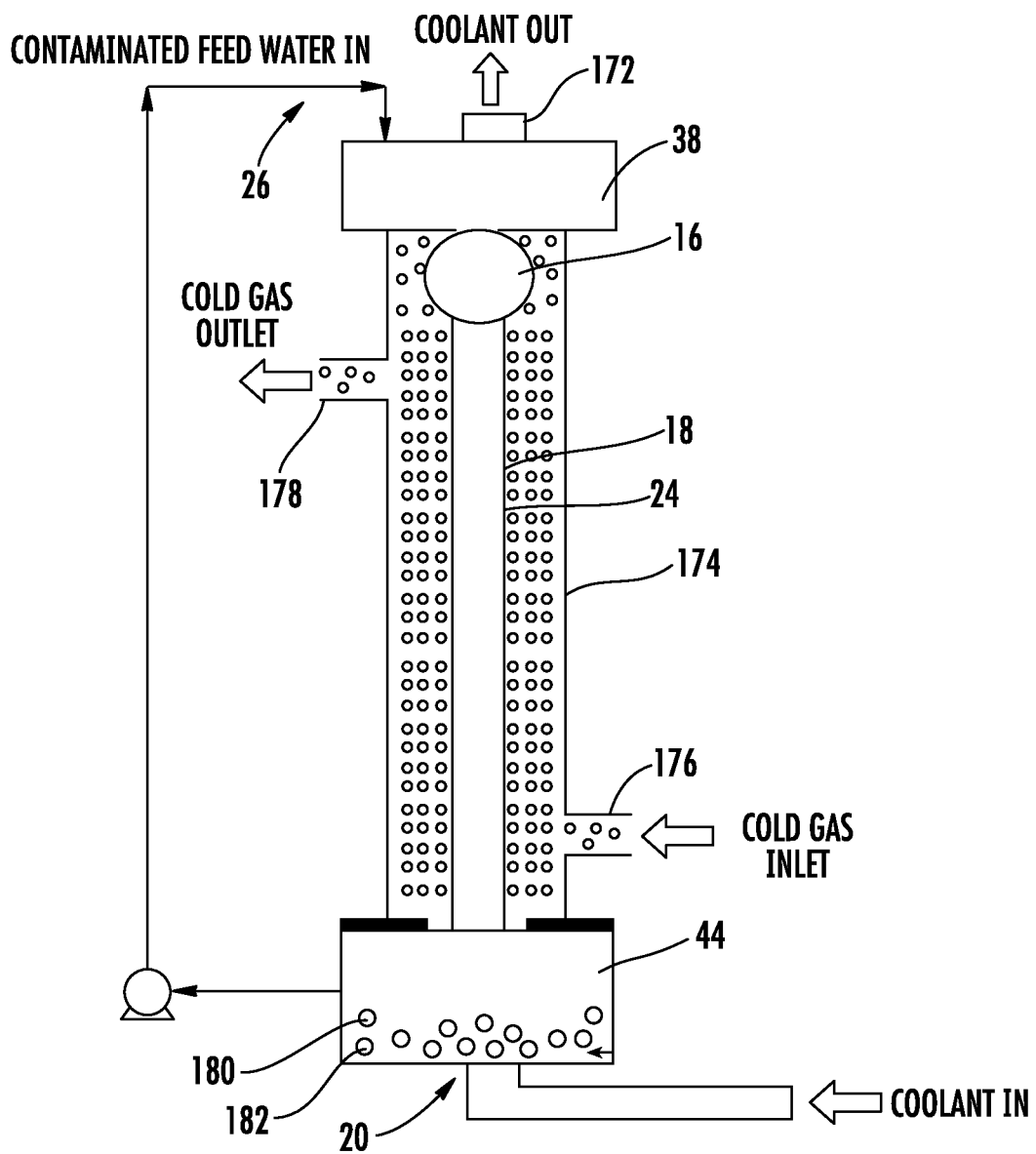
FIG. 21 is a schematic, side view of the heat and mass transfer system configured to treat radioactive wastewater.
Figure 22:
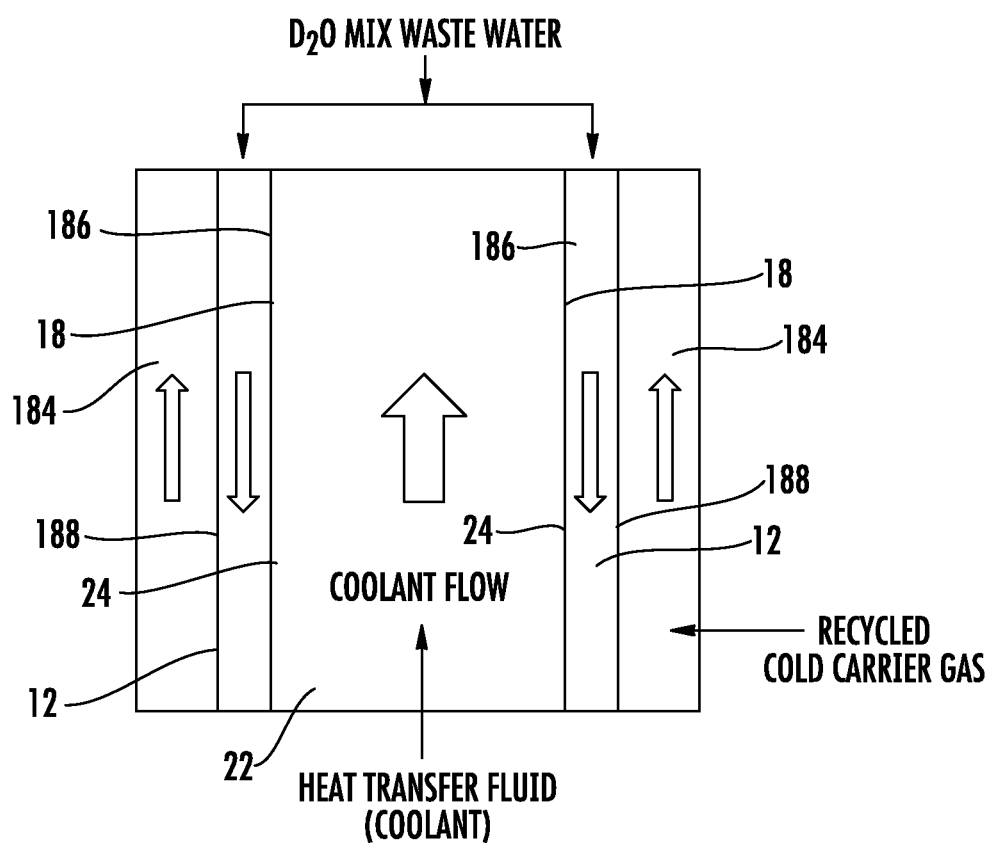
FIG. 22 is a schematic, side view of a portion of the heat and mass transfer system configured to treat radioactive wastewater.

In another application, as shown in FIGS. 21 and 22, the heat and mass transfer system 10 may be configured to treat radioactive wastewater. In particular, the heat and mass transfer system 10 may remove $T_2O$ and $D_2O$ from a fluid, and more specifically may remove $T_2O$ and $D_2O$ as crystals from a liquid. As shown in FIG. 21, the feed fluid may be provided to the fluid supply system 26, from the fluid supply system 26 to the fluid containment vessel 38 and from the fluid containment vessel 38 to the one or more flow distribution heads 16 and the one or more downstream conduits 18, where the feed fluid is cooled. The cooled feed fluid may be collected in the fluid capture system 44. Coolant 22 may be provided via the heat transfer medium supply system 20 and into the one or more downstream conduits 18 where the coolant cools the one or more downstream conduits 18 and feed fluid on the outer surface 24 of the downstream conduit 18. Coolant may be exhausted through outlet 172. The heat and mass transfer system 10 of FIG. 21 may include a cooling chamber 174 that surrounds at least a portion of the downstream conduit 18. The cooling chamber 174 may be supplied with one or more cooling gases 184 via gas inlet 176 and may exhaust used cooling gases via gas outlet 178.

Tritiated water ($T_2O$) and heavy water ($D_2O$) have freezing points, which are higher than pure water ($H_2O$). Freezing point for $T_2O$ is 3.82 degrees Celsius (° C.), $D_2O$ is 4.5° C. and pure water is 0° C. Ice crystals of $T_2O$ and $D_2O$ are denser than water at 2° C. The heat and mass transfer system 10 uses this difference in density to separate the ice crystals of $T_2O$ and $D_2O$ from pure water. Using the heat and mass transfer system 10 shown in FIG. 21, radioactive contaminated wastewater can be rapidly cooled to 2° C., and the water temperature can be efficiently controlled due to the enhanced heat transfer characteristics of the system 10. The heat and mass transfer system 10 provides twofold cooling. In particular, as shown in FIG. 22, the heat and mass transfer system 10 may provide cooling at the solid-liquid interface 186 on the downstream conduit 18 and gas-liquid interface 188 on the outer surface of the feed fluid flowing down the outside of the downstream conduit 18. As such, the heat and mass transfer system 10 provides both direct and indirect fooling with precise temperature control. Cooling at the solid-liquid interface may be provided by the flow of coolant 22 flowing counter or in the same direction inside the downstream conduit 18, which may be a heat transfer tube. Cooling at the gas-liquid interface maybe provided by a cooling gas such as liquid nitrogen flowing counter or in the same direction on the shell side of the downstream conduit 18. This configuration of the heat and mass transfer system 10 of FIGS. 21 and 22 will ensure uniform temperature of the contaminated water flowing down the downstream conduit 18.

As the feed fluid flows via gravity along the outer surface 24 of the downstream conduit 18, the feed fluid is rapidly cooling by the coolant, which may be, but is not limited to being, a liquid, flowing counter current within the downstream conduit 18. High overall heat transfer coefficient at the downstream conduit 18 maintains the temperature of the downstream conduit 18 within about two degrees of the temperature of the downstream conduit 18. In at least one embodiment, cooling gas, such as, but not limited to nitrogen, flowing around the downstream conduit 18 in the cooling chamber 174 will cool the outside film of the falling liquid film of feed fluid on the downstream conduit 18. When the contaminated water reaches 3.8° C., $T_2O$ crystals and $D_2O$ crystals will form along the length of the downstream conduit 18 and instead of sticking to the downstream conduit 18, the $T_2O$ crystals will remain in the liquid film on the downstream conduit 18 due to the shear forces created by the surface waves of the falling film of contaminated water. When the feed fluid reaches 3° C., $D_2O$ crystals will form along the downstream conduit 18 and will likewise remain in the liquid film on the downstream conduit 18 and be collected in the bottom reservoir of the fluid capture system 44. The downstream conduit 18 may be adjusted, such as through the addition of one or more coatings, to influence the surface tension in order to prevent scaling. Once the $T_2O$ crystals and $D_2O$ crystals form, the crystals will drop into the bottom reservoir of the fluid capture system 44 due to gravity and will settle at the bottom due to the densities of the $T_2O$ crystals and $D_2O$ crystals being greater than water. $D_2O$ crystals are ten times heavier than water and will settle at the bottom. The ice crystals of $T_2O$ and $D_2O$ 180, 182, respectively, can be separated from water in the fluid capture system 44 using a filtration system, such as a continuous filtration system. Because this process is based on sensible heat manipulation, the process is very energy efficient. An advantage of this process over evaporation is that the heat of formation of $D_2O$ crystals is about six times less than the latent heat of evaporation of water. The thermal performance of the heat and mass transfer system 10 of FIGS. 21 and 22 is significantly greater than conventional thermal systems.

Figure 23:
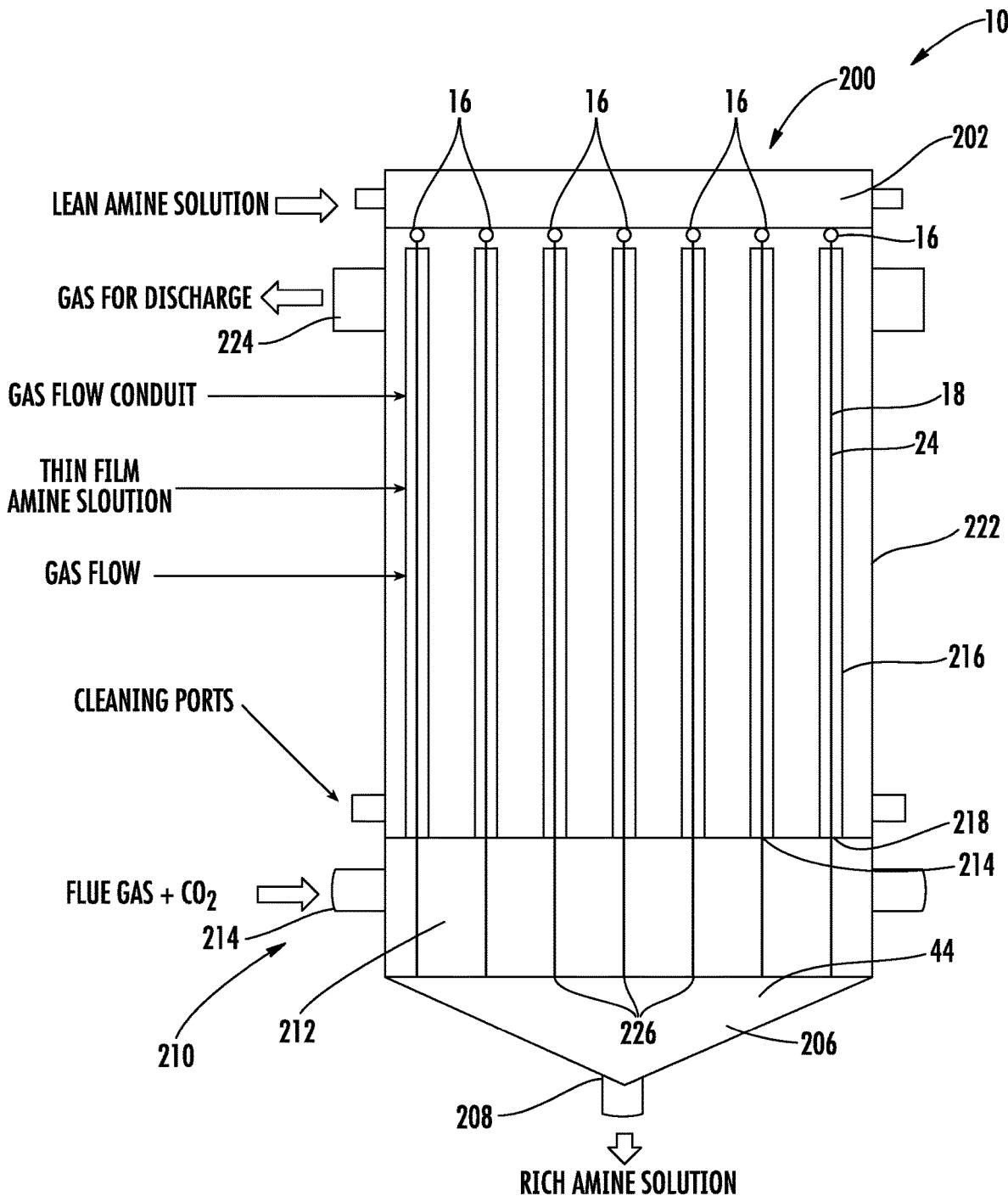
FIG. 23 is a schematic, side view of the heat and mass transfer system configured to remove a constituent from a liquid, such as, but not limited to, carbon dioxide ($CO_2$) sequestration and gas-liquid mass transfer.
Figure 24:
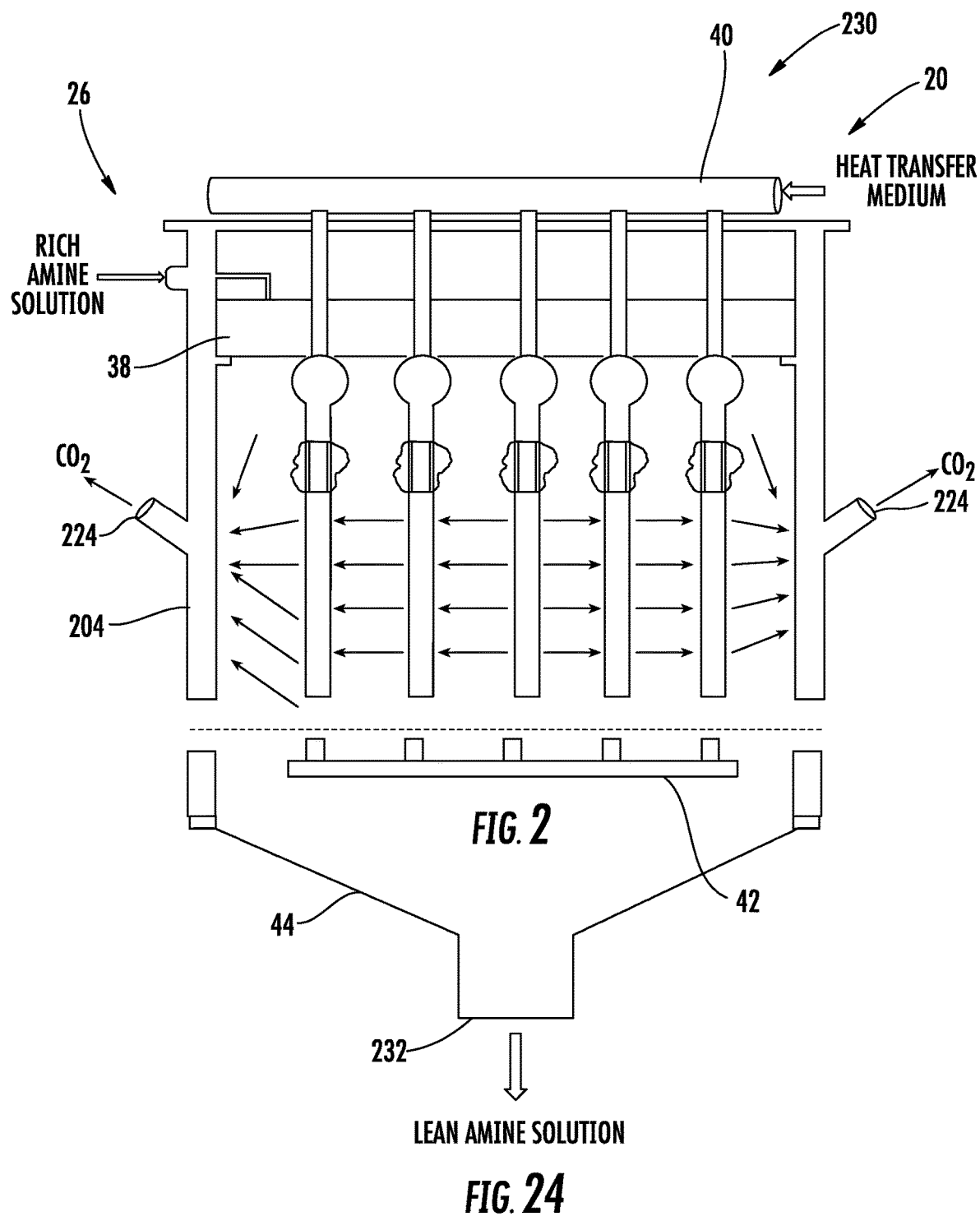
FIG. 24 is a schematic, side view of an evaporation module of the heat and mass transfer system configured to remove a constituent from a liquid, such as, but not limited to, carbon dioxide ($CO_2$) sequestration.

In another application, as shown in FIGS. 23 and 24, the heat and mass transfer system 10 may be configured to remove a constituent from a liquid, such as, but not limited to, carbon dioxide ($CO_2$) sequestration and gas-liquid mass transfer. In particular, the heat and mass transfer system 10 provides superior gas-liquid mass transfer characteristics for carbon dioxide sequestration, removal of ammonia from wastewater, removal of methanol from water or aqueous fluids and other processes where mass transfer of a gas to and from a liquid is desired. In at least one embodiment, we are not trying to change the temperature of a fluid; instead, provide as great a surface are as possible to enable as much carbon dioxide ($CO_2$) sequestration and gas-liquid mass transfer as possible. As shown in FIG. 23, a liquid supply system 200 may include one or more liquid supply manifolds 202 in fluid communication with one or more flow distribution heads 16 and the one or more downstream conduits 18. In at least one embodiment, the heat and mass transfer system 10 may include a plurality of flow distribution heads 16 and the one or more downstream conduits 18. In fact, in at least one embodiment, the downstream conduits 18 may have a diameter of about one quarter of an inch and have a length of about 10 feet. The heat and mass transfer system 10 may include thousands of the downstream conduits 18 aligned with each other and positioned within a shell 204. The downstream conduits 18 may be generally aligned with a longitudinal axis of the shell 204. At least one embodiment creates a very large active surface area on the outer surfaces 24 of the downstream conduits 18. An incredible amount of surface area is available within a single housing with a diameter of about six feet and a height of about 10 feet, which is substantially smaller than conventional mass transfer systems. The liquid supply system 200 may also include a fluid capture system 44 for capturing fluid falling from the downstream conduits 18. In at least one embodiment, the fluid capture system 44 may be formed from a collection reservoir 206 positioned below the downstream conduits 18. Fluid may be exhausted from the fluid capture system 44 via one or more outlets 208.

As shown in FIG. 23, the heat and mass transfer system 10 may include a supply gas system 210 configured to provide dirty gas to the heat and mass transfer system 10 to remove one or more constituents from the dirty gas. The supply gas system 210 may include a supply gas manifold 212 that receives gas through one or more inlets 214. The supply gas system 210 may include at least one gas conduit 216 positioned radially outward of one or more downstream conduits 18. In at least one embodiment, each downstream conduit 18 may include a gas conduit 216 positioned concentrically around the downstream conduit 18. The gas conduit 216 should be sized such that a void exists between an outer surface 24 of the downstream conduit 18 and an inner surface of the gas conduit 216. The gas conduit 216 may have a cylindrical cross-sectional shape or may have another shape. Each gas conduit 216 may have an inlet 218 in fluid communication with the supply gas manifold 212 and an outlet 220 in fluid communication with a gas collection chamber 222. In at least one embodiment, the gas collection chamber 222 may be formed, in part, by the shell 204. The supply gas manifold 212 may be positioned at a bottom end 226 of the downstream conduit 18, and the outlet 220 of the gas conduit 216 may terminate near the flow distribution head 16, thereby maximizing the benefit of the exposure of the dirty gas to the cleaning fluid. The gas collected in the gas collection chamber 222 may be exhausted through one or more outlets 224. The configuration of the supply gas system 210 shown in FIG. 23 creates a counter flow of the gas flowing within the gas conduit 216. In other embodiments, the direction of flow of the gas flowing within the gas conduit 216 may be the same as the direction of flow of liquid on the downstream conduit 18 of the liquid supply system 200. The counter flow operation coupled with the fact that the liquid stream of the liquid in the liquid supply system 200 can be continuously heated or maintained at a desired high or low temperature, as it flows down along the outside of the downstream conduit 18, creates additional efficiency and productivity of the heat and mass transfer system 10 in comparison to conventional technology. The temperature of the liquid can be selected based on the solubility of the component which is desired to be removed, such as solubility of ammonia in water when ammonia is desired to be removed.

As shown in FIG. 24, the heat and mass transfer system 10 may include an evaporation module 230. The evaporation module 230 may be configured to pass a heated heat transfer fluid through interior aspects of downstream conduits 18 to heat a thin film of fluid flowing on outer surfaces of the downstream conduits 18. As shown in FIG. 24, the evaporation module 230 may include a heat transfer medium supply system 20 formed from a supply manifold 40 coupled to the downstream conduits 18 and a downstream exhaust manifold 42. The evaporation module 230 may include fluid supply system 26 formed from one or more fluid containment vessels 38 configured to supply fluid to an outer surface 14 of the flow distribution head 16 and to the downstream conduits 18. The fluid containment vessel 38 may be configured to supply fluid to the outer surface 14 of the flow distribution head 16 in any number of ways. In at least one embodiment, the fluid containment vessel 38 may include an outlet 34 at each flow distribution head 16. The outlet 34 may enable fluid to fall, via gravity, from the fluid containment vessel 38 to contact the outer surface 14 of the flow distribution head 16. The fluid strikes the flow distribution head 16 and flows around the head 16 and onto the downstream conduit 18. In at least one embodiment, the outlet 34 may be an annular outlet extending around the downstream conduit 18 at the intersection between a wall defining the fluid containment vessel 38 and the downstream conduit 18. The annular outlet 34 may or may not have a constant radial width. The annular outlet 34 with a constant radial width helps create a uniform, thin film of fluid on the outer surface 14 of the flow distribution head 16. The evaporation module 230 may include a fluid capture system 44 configured to collect fluid flowing down the outer surfaces 24 of the downstream conduits 18 and exhaust the fluid from an outlet 232. Gases, such as, but not limited to, carbon dioxide, may be collected within the gas collection chamber 22, formed, in part, by the shell 204, and may be exhausted through one or more outlets 224.

For removal of carbon dioxide from flue gas, the liquid used within the liquid supply system 200 may be an amine solution, or other suitable solution with high affinity for carbon dioxide. The amine solution may flow along the outer surface 24 of the downstream conduits 18 from top to bottom due to gravity. The dirty gas used in the supply gas system 210 may be flue gas containing carbon dioxide. The flue gas containing carbon dioxide may flow in a counter direction relative to a direction of flow of the amine solution in the liquid supply system 200. As such, the flue gas containing carbon dioxide may flow from bottom to top. In other embodiments, a co-current flow configuration may also be used based on process requirements. Due to the excellent thin film mass transfer characteristics, carbon dioxide gas is absorbed by the amine solution, which has a high affinity for carbon dioxide. The amine solution exits from the bottom of the system through outlet 208 in the collection reservoir 206, and carbon dioxide free gas exits from the shell side of the gas collection chamber 222 through outlet 224. The liquid exhausted from the outlet 208 may be amine rich solution, which is amine including $CO_2$, may be fed to the evaporation module 230. In particular, the amine rich solution may be fed to the fluid supply system 26. In the fluid supply system 26 of the evaporation module 230, the amine rich solution can be heated by using a heat transfer fluid flowing through the downstream conduit 18 from top to bottom (co-current flow), as shown in FIG. 24, or via bottom to top (counter current flow). As the amine rich solution gets heated flowing down along the downstream conduit 18, clean carbon dioxide will leave the solution and will exit from the outlets 224 in the shell 204. Once removed from the evaporation module 230, the exiting clean carbon dioxide may be reacted with hydroxide solutions to form carbonates or bi-carbonates. In fact the carbon dioxide can be reacted with any reacting fluid (gas or liquid) to form a useful product. This combination of absorption, desorption of carbon dioxide followed by reaction results in a compact and energy efficient carbon dioxide recovery and utilization method. The high surface area density of the heat and mass transfer system 10 (in excess of 1000 $m^2/m^3$) results in compact and energy efficient modules for the above-mentioned processes. The same concept can be used for a range of gas-liquid mass transfer operation for example, and not be way of limitation, stripping of methanol from water using steam or hot air.

Figure 25:
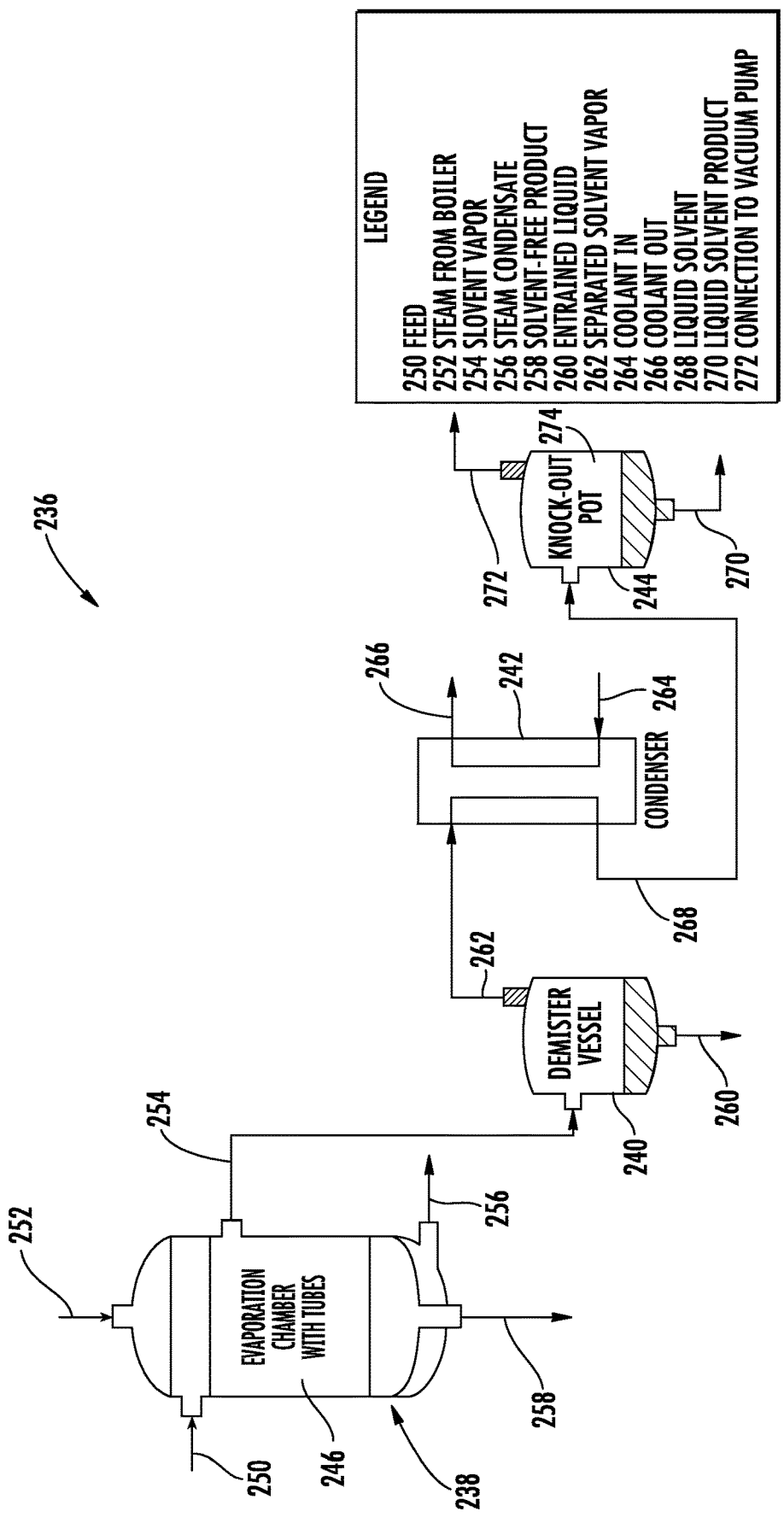
FIG. 25 is a schematic, side view of the heat and mass transfer system configured to operate as a solvent removal system.

In another application, as shown in FIG. 25, the heat and mass transfer system 10 may be configured to operate as a solvent removal system 236. The heat and mass transfer system 10 may be configured to remove solvents from oil, such as, but not limited to, waste oil, water and other liquid feed. Solvents in the feed fluid may be evaporated in an evaporation chamber 246 of an evaporation module 238, which may be under vacuum. The feed fluid may form a concentrate that is exhausted from the evaporation module 238 and recirculated back into the evaporation module 238 for reprocessing. This embodiment of the heat and mass transfer system 10 may be capable of processing fluids with high concentrations of total dissolved solids, such as, but not limited to, concentrated feed fluids with high concentrations of total dissolved salts, produced water and flow-back water generated during the fracking process. In particular, the configuration of the heat and mass transfer system 10 minimizes the temperature gradient between the feed fluid flowing on the outer surface 24 of the downstream conduit 18 and the wall forming the downstream conduit 18, thereby greatly reducing, if not eliminating, the ability of scale to form. As a result, the heat and mass transfer system 10 may effectively process produced water, flow-back water whereby the evaporation module can evaporate water and produce a concentrated slurry of salts, which may be further processed to produce salt crystals or may be disposed in disposal wells. In addition, the shell side of the downstream conduit 18 may be maintained in a vacuum, thereby further enhancing the ability to form vapor with concentrated feed fluids with high concentrations of total dissolved salts.

The solvent removal system 236 may include an evaporation module 238, which may be configured similarly to the evaporation module 230 shown in FIG. 24. The solvent removal system 236 may include a demister vessel 240 and a condenser 242. The condenser 242 may be any appropriate configuration for transferring heat between two fluids while keeping the two fluids separated and out of contact of each other. The solvent removal system 236 may also include a knock-out pot 244 configured to contain a liquid to remove solvent vapors from the gas being passed through the knock-out pot 244.

During the solvent removal process, the fluid feed containing a solvent is introduced into the evaporation chamber 246 containing downstream conduits 18 via an inlet at conduit 250. A heat transfer liquid, such as, but not limited to, steam or Dowtherm heating fluid, from conduit 252, may be used to heat the downstream conduits 18 and the evaporating chamber 246 (also referred to as the shell side), via passing the fluid through internal aspects of the downstream conduit 18. The evaporating chamber 246 may be maintained under vacuum in order to reduce the boiling point of the solvent within the feed fluid. As hot fluid is passed through the downstream conduits 18 and feed fluid is positioned on the outer surface 14 of the flow distribution head 16 and the outer surface 24 of the downstream conduit 18, solvent vapor is created from the feed fluid and contained within the evaporation chamber 246. Steam condensate is exhausted from the evaporation module into conduit 256. The solvent vapor may be exhausted from the evaporation chamber 246 into conduit 254 and may be passed into the demister vessel 240, which will remove any carry over process liquid from the solvent vapor. Solvent vapor is exhausted from the demister vessel 240 via conduit 262 into the condenser 242. Entrained liquid is exhausted from the demister vessel 240 into conduit 260. Solvent vapors are cooled in the condenser 242, such as through liquid cooling, to form condensed vapor in liquid form. The liquid solvent is exhausted from the condenser 242 via conduit 268. The coolant is supplied to the condenser 242 via conduit 264 and exhausted from the condenser 242 via conduit 266. The condensed vapor is passed to the knock-out pot via conduit 268. The top section 274 of the knock-out pot 244 may be connected to a vacuum pump so that the entire system (the evaporation chamber 246, demister vessel 240, the condenser 242 and the knock-out pot 244) may be maintained under a desired vacuum condition via conduit 272. The condensed solvent vapors may then be removed from the knock-out pot 244 via conduit 270.

Figure 26:
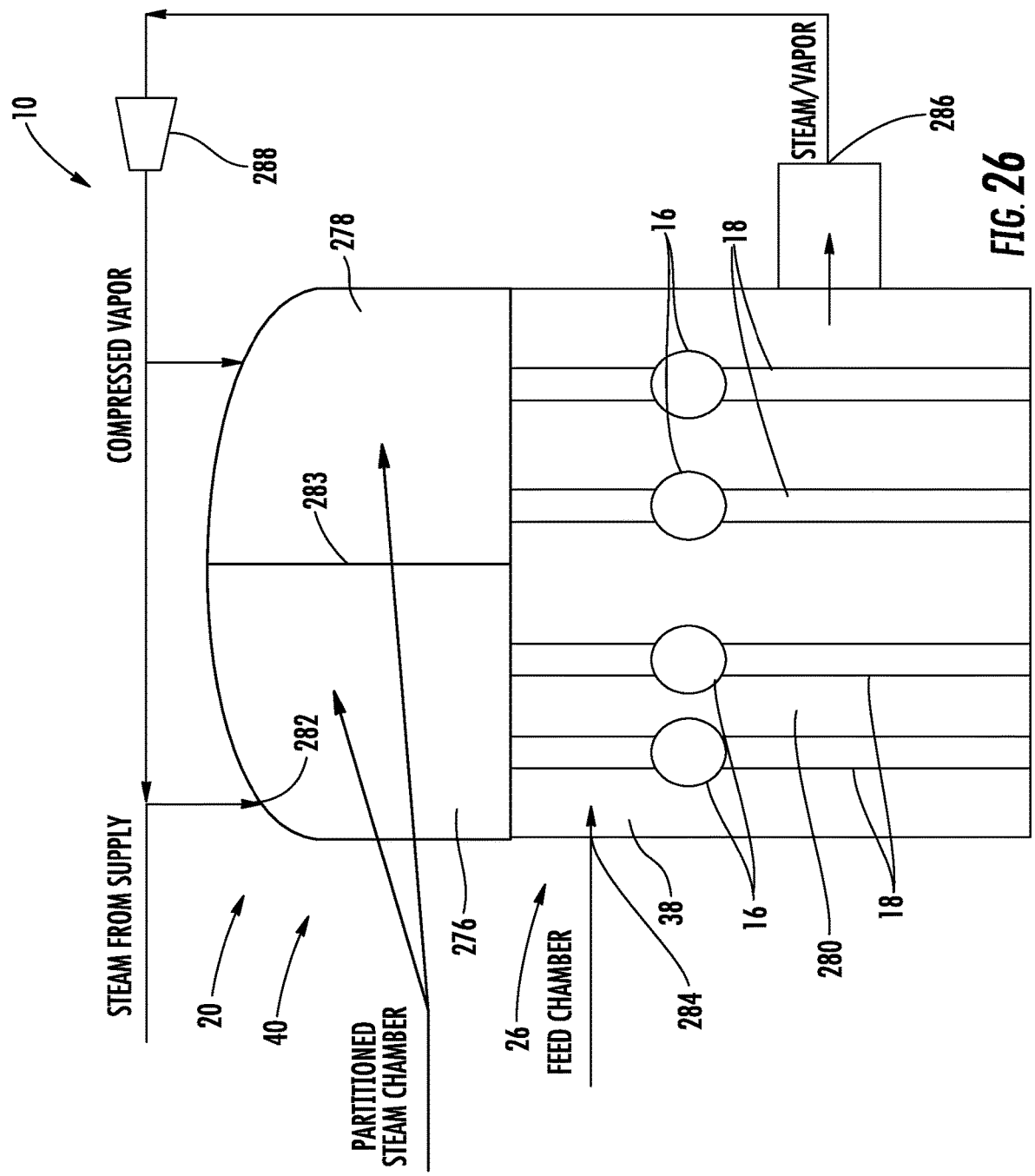
FIG. 26 is a schematic, side view of the heat and mass transfer system configured to include a partitioned supply manifold formed from first and second supply manifolds.
Figure 27:
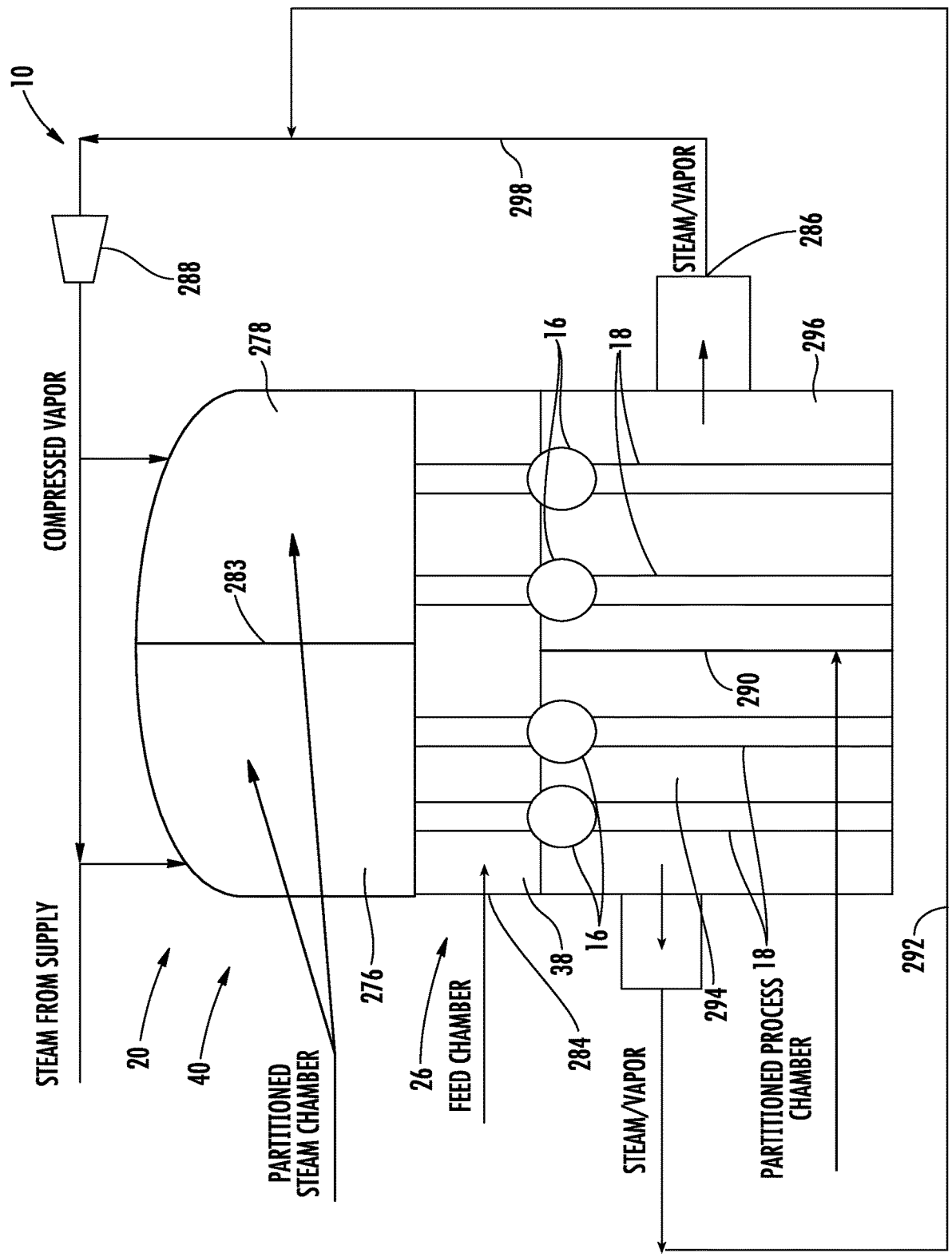
FIG. 27 is a schematic, side view of the heat and mass transfer system configured to include a vapor generation chamber partitioned into first and second vapor generation chambers.
Figure 28:
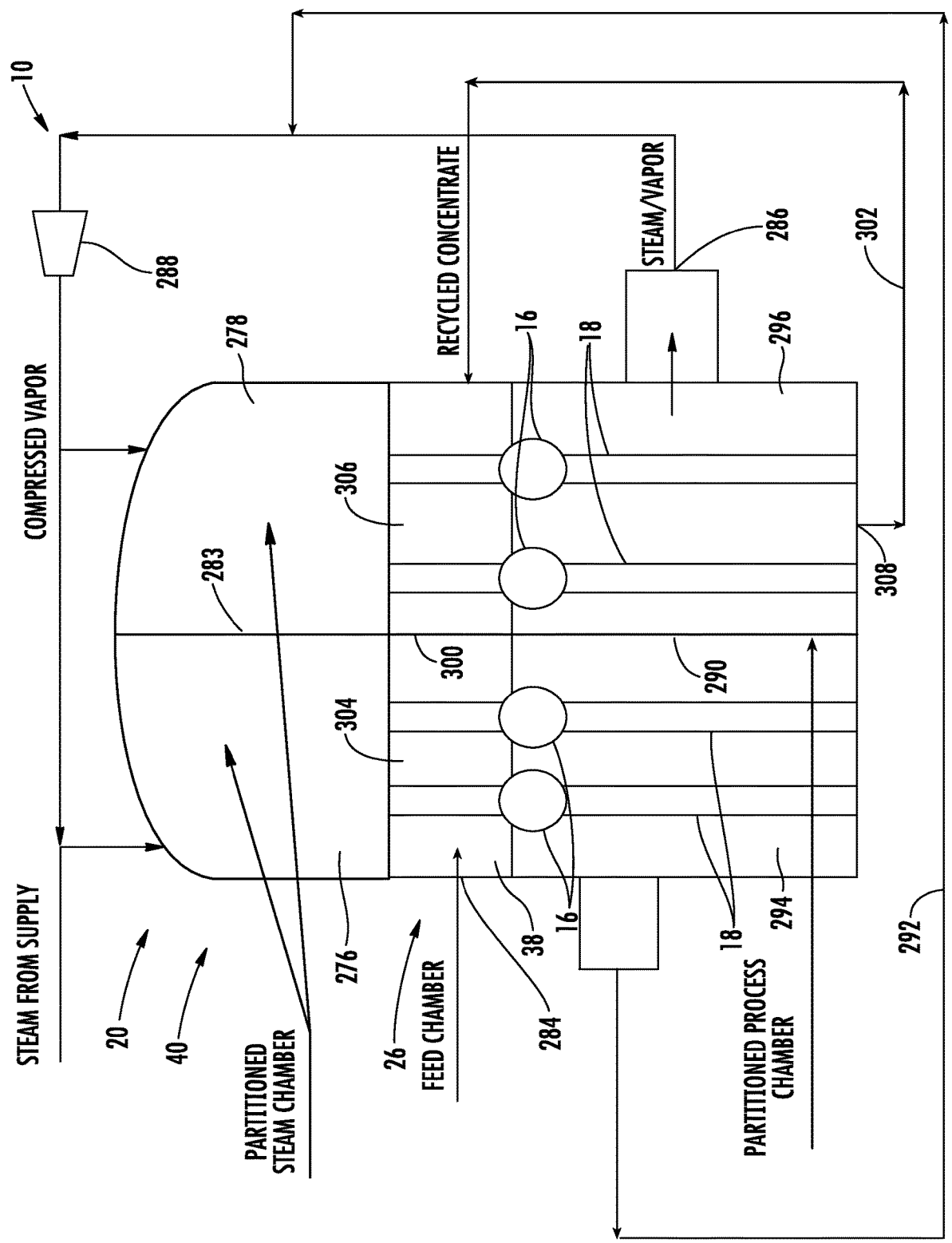
FIG. 28 is a schematic, side view of the heat and mass transfer system configured to include a fluid containment vessel partitioned into first and second fluid containment vessels.

In another embodiment, as shown in FIGS. 26-28, the heat and mass transfer system 10 may be configured to include a partitioned supply manifold 40 of the heat transfer medium supply system 20. This configuration of the heat and mass transfer system 10 may allow a single evaporation module to be operated as a Mechanical Vapor Compression (MVC) system. Steam from a boiler can start the evaporation process and as the vapors are generated, compressed, and fed into the vapor generation chamber 280, the system 10 an operate under MVC mode. Overall thermal efficiency of system 10 increases when the system 10 is operated under MVC mode because the latent heat from the vapor is re-used to evaporate new feed. The heat and mass transfer system 10 also has a significantly smaller footprint than if two separate unit were to be used, thereby saving valuable floor space and also saving costs for duplicate components.

The partitioned supply manifold 40 may be formed from first and second supply manifolds 276, 278 separated by partition wall 283. As shown in FIG. 26, the heat and mass transfer system 10 may include a fluid supply system 26 including one or more fluid containment vessels 38 in fluid communication with one or more flow distribution heads 16 and one or more downstream conduits 18. The interior aspects of the downstream conduits 18 may be in fluid communication with the first or second supply manifolds 276, 278. A vapor generation chamber 280 may surround at least a portion of the downstream conduits 18 and flow distribution heads 16 and be positioned beneath the fluid containment vessel 38 of the fluid supply system 26. During use, steam is supplied to the first supply manifolds 276 at inlet 282 and passed into interior aspects of the downstream conduits 18. Feed fluid may be passed into the fluid supply system 26 and into the fluid containment vessel 38 at inlet 284. The feed fluid may be passed from the fluid containment vessel 38 onto the outer surfaces 14 of the flow distribution heads 16 and the outer surfaces 24 of the downstream conduits 18 where a portion of the feed fluid evaporates, thereby forming a vapor within the vapor generation chamber 280. The vapor may be exhausted from the vapor generation chamber 280 via outlet 236 where the vapor may be passed through a compressor 288, which heats and increases the pressure of the vapor. The pressurized vapor is then passed into the second supply manifolds 278 or the first supply manifold 276, or both.

The heat and mass transfer system 10 shown in FIG. 27 is very similar to the embodiment shown in FIG. 26 with the exception that the vapor generation chamber 280 is partitioned via partition wall 290 and an additional recovery loop 292. This configuration of the heat and mass transfer system 10 may also allow a single evaporation module to be operated as a Mechanical Vapor Compression (MVC) system. This configuration also enjoys the same advantages as previously set forth in connection with FIG. 26. The remainder of the heat and mass transfer system 10 shown in FIG. 27 is the same as that discussed in connection with FIG. 26 and thus will not be discussed for brevity sake. The vapor generation chamber 280 may be partitioned via partition wall 290 forming first and second vapor generation chambers 294, 296. A recovery loop conduit 292 may receive exhausted vapor from the first generation chamber 294 and pass the vapor to the exhaust vapor conduit 298 extending from the outlet 286 in the second vapor generation chambers 296 such that the exhaust vapor streams from both the first and second vapor generation chambers 294, 296 may be compressed and heated and further passed back to the first or second supply manifolds 276, 278, or both, for reprocessing.

The heat and mass transfer system 10 shown in FIG. 28 is very similar to the embodiment shown in FIGS. 26 and 27 with the exception that the fluid containment vessel 38 of the fluid supply system 26 is partitioned via partition wall 300 into first and second fluid containment vessels 304, 306 and an additional concentrate recovery conduit 302. This configuration also enjoys the same advantages as previously set forth in connection with FIGS. 26 and 27. In addition, this configuration shown in FIG. 28 allows the evaporation module to operate as a two-pass system where the reject from the first pass can be used as a feed for the second pass. This will allow for achieving higher reject concentration. Instead of having two evaporators to perform a given thermal duty, only one evaporator may be used. The remainder of the heat and mass transfer system 10 shown in FIG. 28 is the same as that discussed in connection with FIGS. 26 and 27 and thus will not be discussed for brevity sake. The fluid containment vessel 38 of the fluid supply system 26 is partitioned via partition wall 300 into first and second fluid containment vessels 304, 306. A concentrate recovery conduit 302 may receive feed fluid at outlet 308 after having passed over the flow distribution head 16 and the downstream conduit 18 and pass the recycled concentrate to the second fluid containment vessel 306 such that the recovered feed fluid may be reprocessed In at least one embodiment, as shown in FIGS. 29-31, the heat and mass transfer system 10 may include a downstream conduit 18 including an internal flow distributor 310 positioned within the downstream conduit 18 and configured to increase the efficiency of the system by keeping the heat transfer medium in contact with the wall forming the downstream conduit 18 rather than in internal aspects of the downstream conduit 18. The internal flow distributor 310 may or may not be formed from a solid material but may prevent fluid flow into the internal flow distributor 310. In at least one embodiment, the internal flow distributor 310 may be a hollow tube that is caped at each end. The internal flow distributor 310 may be held in position via one or more struts 312. The struts may have a thin profile when viewed looking in the direction of fluid flow in the downstream conduit 18, thereby blocking very little flow through the downstream conduit 18. The internal flow distributor 310 may block any amount of the space within the downstream conduit 18, and in at least one embodiment may block more than 50 percent of the cross-sectional area within the downstream conduit 18. The internal flow distributor 310 may block up to about 90 percent of the cross-sectional area within the downstream conduit 18. The direction of flow of heat transfer medium within the downstream conduit 18 may be counter current flow, as shown in FIG. 29 or co current flow, as shown in FIG. 30. As shown in FIG. 31, the downstream conduit 18 may include a heat transfer enhancement structure 314 positioned within the heat transfer medium pathway 316 between the downstream conduit 18 and the internal flow distributor 310 to increase heat transfer. In at least one embodiment, the heat transfer enhancement structure 314 may be a mesh. The mesh may increase turbulence, thereby increasing heat transfer. In addition, the mesh may be a metal mesh, thereby increasing the surface area for convection to occur.

Figure 32:
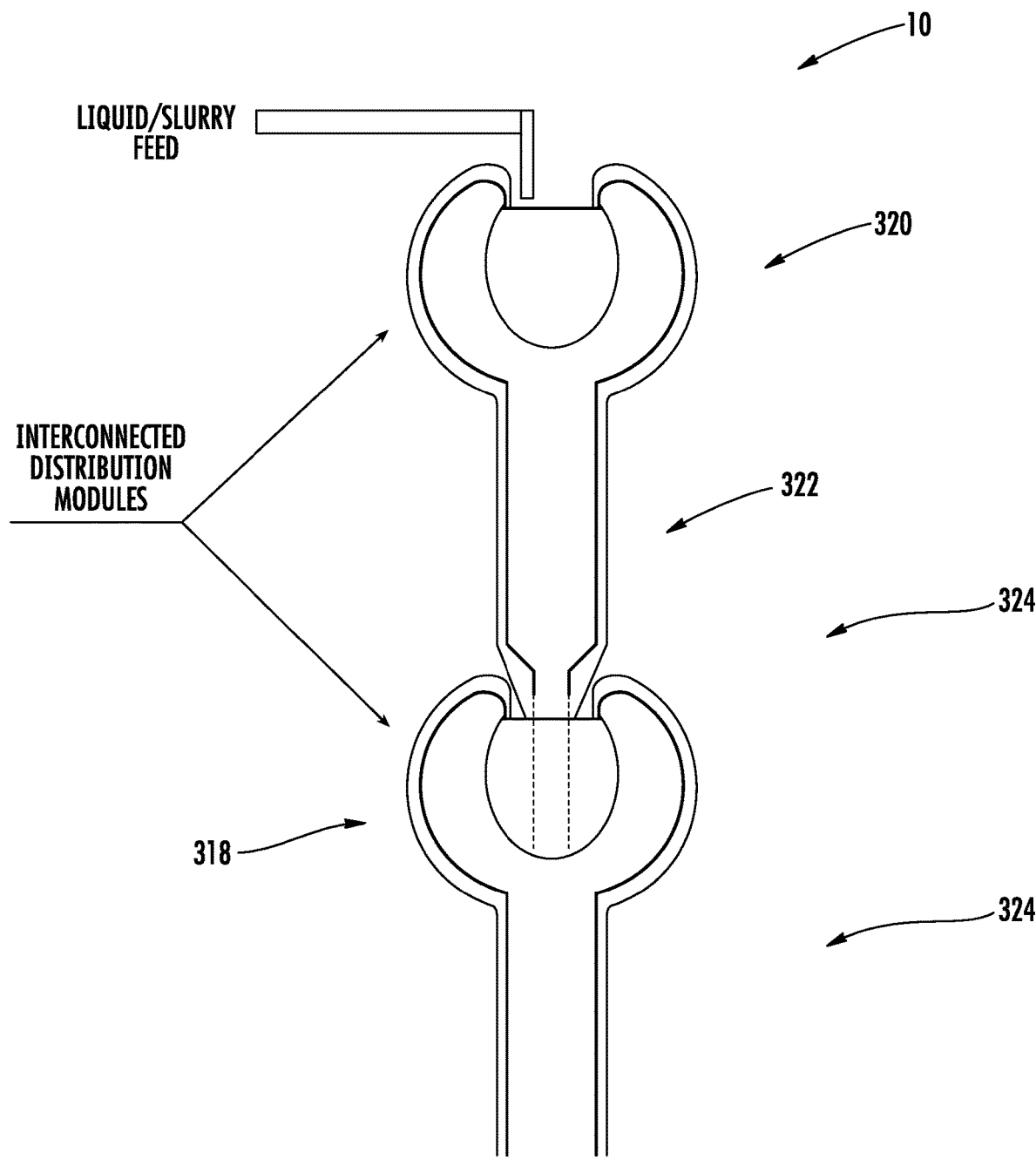
FIG. 32 is a schematic, side view of the heat and mass transfer system configured with two or more flow distribution heads and downstream conduits in series with one another.

In another embodiment, as shown in FIG. 32, the heat and mass transfer system 10 may include two or more flow distribution heads 16 and downstream conduits 18 in series with one another. As such, a second flow distribution head 318 may be positioned downstream of a first flow distribution head 320 and a first downstream conduit 322, thereby forming interconnected distribution modules 324. The first and second flow distribution heads 320, 318 may be formed as shown in FIGS. 19 and 20. This configuration is particularly suitable for increasing the flow residence time of the process fluid flowing from top to bottom. The ability to influence the residence time is essential for certain catalytic processes where the liquid residence time has to be matched with the reaction kinetics, in order to complete the reaction in a single flow pass. The heat and mass transfer system 10 of this embodiment including two or more flow distribution heads 16 and downstream conduits 18 in series with one another, has a significantly smaller footprint than if two separate unit were to be used, thereby saving valuable floor space and also saving costs for duplicate components.

Figure 33:
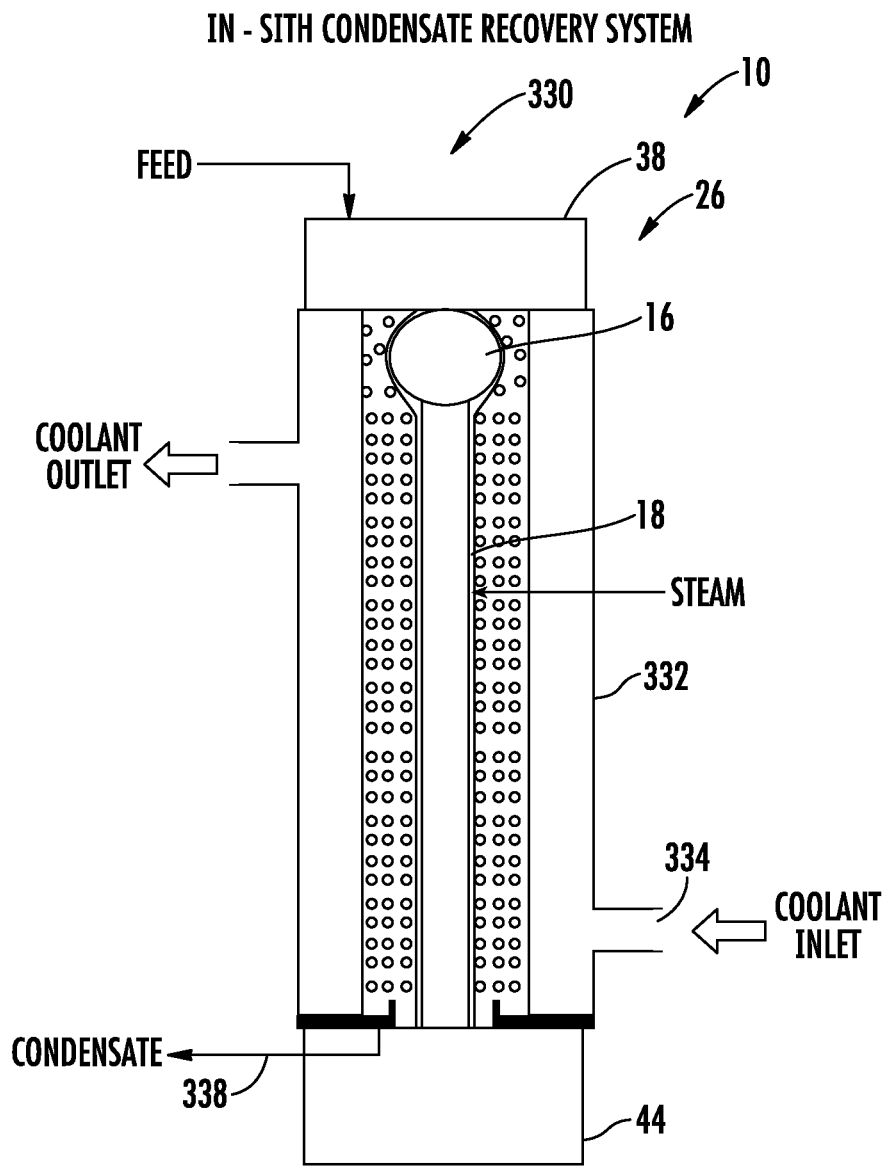
FIG. 33 is a schematic, side view of the heat and mass transfer system configured as an in-situ condensate recovery system.

In another embodiment, as shown in FIG. 33, the heat and mass transfer system 10 may be configured as an in-situ condensate recovery system 330. The condensate recovery system 330 may include a fluid supply system 26 including one or more fluid containment vessels 38 in fluid communication with one or more flow distribution heads 16 and one or more downstream conduits 18. The feed fluid may be captured in a fluid capture system 44 positioned downstream from bottom ends of the downstream conduits 18. The flow distribution heads 16 and downstream conduits 18 may be housed within a coolant chamber 332 having a coolant inlet 334 and a coolant outlet 336. In at least one embodiment, the feed fluid passed to the fluid supply system 26 may be a vapor. The vapor may be passed through the flow distribution heads 16 and downstream conduits 18 where the vapor is cooled due to the counter flow current of coolant within the coolant chamber 332. The vapor may condense into a liquid and be captured in the fluid capture system 44. The liquid condensate may be exhausted via conduit 338.

The heat and mass transfer system 10 may be configured to be used in numerous applications. For instance, the heat and mass transfer system 10 may be configured to be used in at least one or more of the following applications, which are provided as examples and not for purposes of limitation:

1. Heating and cooling of liquids including heat sensitive and viscous liquids such as heavy oils, glycerin and maple syrup;

2. Evaporation of liquids including heat sensitive liquids such as fruit juice, recovery of clean water from seawater and water with high total dissolved solid content such as produced and frac water in the oil and gas sector, concentration of liquids including but not limited to chemically aggressive high specific gravity liquids by evaporation of water, concentration of rinse water and industrial waste water resulting from the production of dyes and inks, concentration of leachate and treatment of flood water and agriculture water;
3. Disinfection of liquids including, but not limited to, water using ultra violet radiation, microwave energy, steam or any other heat transfer fluid;
4. Synthesis of chemicals using microwave, ultra violet radiation or a combination of both and particularly reactions including but not limited to using ionic liquids or advanced catalysts typically classified as green catalysts;
5. Coupling of the evaporator module with an energy efficient steam compressor to develop a mechanical vapor compression system, which may be operated in series or parallel mode;
6. Mass transfer using counter or co-current gas or steam stripping for the removal of volatile organic compounds from contaminated liquids;
7. Bio-treatment of industrial and landfill waste water;
8. Advanced oxidation process for the reduction of COD (Chemical Oxygen Demand) and BOD (Biological Oxygen Demand) of wastewater by using a combination of catalyst and Ultra violet radiation;
9. Removal of water organic liquids and vice versa using the pervaporation configuration;
10. Catalytic liquid-liquid, gas-gas and gas-liquid reactions using the described system;
11. Crystallization of solids including but not limited to precipitation of salts from supersaturated organic or inorganic liquids, such as precipitation of barium sulphate by rapid heating or cooling using the described configuration; and
12. Concentration and recovery of clean water from radioactive waste water.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A heat and mass transfer system, comprising:
   at least one flow distribution head having a nonlinear outer surface;
   at least one downstream conduit extending downstream from the at least one flow distribution head, wherein the at least one downstream conduit has an outer surface with a width that is narrower than a widest width measurement of the at least one flow distribution head;
   at least one fluid supply system configured to release a liquid film onto the nonlinear outer surface such that the liquid film flows on the nonlinear outer surface of the at least one flow distribution head and onto the at least one downstream conduit;
   at least one heat transfer medium supply system in fluid communication with the at least one downstream conduit such that at least one heat transfer medium is delivered to the at least one downstream conduit while the liquid film flows on the outer surface of the at least one downstream conduit; and
   a condensation capture conduit positioned within the at least one downstream conduit extending downstream from the at least one flow distribution head, whereby a heat transfer medium flows between an outer surface of the condensation capture conduit and an inner surface of the at least one downstream conduit extending downstream from the flow distribution head;
   wherein the condensation capture conduit is caped at each end.

2. The heat and mass transfer system of claim 1, wherein the at least one flow distribution head has an at least partially spherical outer surface.

3. The heat and mass transfer system of claim 1, wherein the condensation capture conduit is held in position via at least one strut.

4. The heat and mass transfer system of claim 1, wherein the heat transfer medium is steam.

5. The heat and mass transfer system of claim 1, wherein the at least one heat transfer medium supply system includes at least one conduit extending into the at least one flow distribution head having the nonlinear outer surface.

6. The heat and mass transfer system of claim 5, wherein the at least one conduit of the at least one heat transfer medium supply system extends into the at least one flow distribution head having an at least partially spherical outer surface at a top of the at least one flow distribution head.

7. The heat and mass transfer system of claim 5, wherein the fluid supply system includes at least one fluid containment surface having an annular shaped outlet defined in part by the at least one conduit of the at least one heat transfer medium supply system extending through the outlet.

8. The heat and mass transfer system of claim 7, wherein an outer diameter of the annular shaped outlet is less than the widest width measurement of the at least one flow distribution head.

9. A heat and mass transfer system, comprising:
   at least one flow distribution head having a nonlinear outer surface;
   at least one downstream conduit extending downstream from the at least one flow distribution head, wherein the at least one downstream conduit has an outer surface with a width that is narrower than a widest width measurement of the at least one flow distribution head;
   at least one fluid supply system configured to release a liquid film onto the nonlinear outer surface such that the liquid film flows on the nonlinear outer surface of the at least one flow distribution head and onto the at least one downstream conduit;
   at least one heat transfer medium supply system in fluid communication with the at least one downstream conduit such that at least one heat transfer medium is delivered to the at least one downstream conduit while the liquid film flows on the outer surface of the at least one downstream conduit; and
   a condensation capture conduit positioned within the at least one downstream conduit extending downstream from the at least one flow distribution head, whereby a heat transfer medium flows between an outer surface of the condensation capture conduit and an inner surface of the at least one downstream conduit extending downstream from the flow distribution head;
   wherein a direction of flow of heat transfer medium between the at least one downstream conduit and the condensation capture conduit is co current flow to a flow of fluid on the at least one flow distribution head and the at least one downstream conduit.

10. A heat and mass transfer system comprising:
at least one flow distribution head having a nonlinear outer surface;
at least one downstream conduit extending downstream from the at least one flow distribution head, wherein the at least one downstream conduit has an outer surface with a width that is narrower than a widest width measurement of the at least one flow distribution head;
at least one fluid supply system configured to release a liquid film onto the nonlinear outer surface such that the liquid film flows on the nonlinear outer surface of the at least one flow distribution head and onto the at least one downstream conduit;
at least one heat transfer medium supply system in fluid communication with the at least one downstream conduit such that at least one heat transfer medium is delivered to the at least one downstream conduit while the liquid film flows on the outer surface of the at least one downstream conduit;
a condensation capture conduit positioned within the at least one downstream conduit extending downstream from the at least one flow distribution head, whereby a heat transfer medium flows between an outer surface of the condensation capture conduit and an inner surface of the at least one downstream conduit extending downstream from the flow distribution head; and
a heat transfer enhancement structure positioned in a heat transfer medium pathway between the at least one downstream conduit and the condensation capture conduit.

11. The heat and mass transfer system of claim 10, wherein the heat transfer enhancement structure is a mesh for increasing turbulence, thereby increasing heat transfer.

12. The heat and mass transfer system of claim 11, wherein the heat transfer enhancement structure is a metal mesh for increasing turbulence, thereby increasing heat transfer.

13. A heat and mass transfer system, comprising:
at least one flow distribution head having a nonlinear outer surface;
at least one downstream conduit extending downstream from the at least one flow distribution head, wherein the at least one downstream conduit has an outer surface with a width that is narrower than a widest width measurement of the at least one flow distribution head;
at least one fluid supply system configured to release a liquid film onto the nonlinear outer surface such that the liquid film flows on the nonlinear outer surface of the at least one flow distribution head and onto the at least one downstream conduit;
at least one heat transfer medium supply system in fluid communication with the at least one downstream conduit such that at least one heat transfer medium is delivered to the at least one downstream conduit while the liquid film flows on the outer surface of the at least one downstream conduit; and
an exhaust manifold in communication with the at least one downstream conduit extending downstream from the at least one flow distribution head.

14. The heat and mass transfer system of claim 13, wherein the at least one flow distribution head has an at least partially spherical outer surface.

15. The heat and mass transfer system of claim 13, further comprising a supply manifold in communication a conduit extending to the at least one flow distribution head.

16. The heat and mass transfer system of claim 13, further comprising a fluid capture system configured to capture used liquid film after the liquid film has flowed over the at least one flow distribution head and the downstream conduit extending downstream from the at least one flow distribution head.

17. A heat and mass transfer system, comprising:
a first evaporator unit, comprising:
at least one flow distribution head having a nonlinear outer surface;
at least one downstream conduit extending downstream from the at least one flow distribution head, wherein the at least one downstream conduit has an outer surface with a width that is narrower than a widest width measurement of the at least one flow distribution head;
at least one fluid supply system configured to release a liquid film onto the nonlinear outer surface such that the liquid film flows on the nonlinear outer surface of the at least one flow distribution head and onto the at least one downstream conduit; and
at least one heat transfer medium supply system in fluid communication with the at least one downstream conduit such that at least one heat transfer medium is delivered to the at least one downstream conduit while the liquid film flows on the outer surface of the at least one downstream conduit;
a second evaporator unit, comprising:
at least one flow distribution head having a nonlinear outer surface;
at least one downstream conduit extending downstream from the at least one flow distribution head, wherein the at least one downstream conduit has an outer surface with a width that is narrower than a widest width measurement of the at least one flow distribution head;
at least one fluid supply system configured to release a liquid film onto the nonlinear outer surface such that the liquid film flows on the nonlinear outer surface of the at least one flow distribution head and onto the at least one downstream conduit; and
at least one heat transfer medium supply system in fluid communication with the at least one downstream conduit such that at least one heat transfer medium is delivered to the at least one downstream conduit while the liquid film flows on the outer surface of the at least one downstream conduit;
wherein the second evaporator unit operates at a lower pressure than the first evaporator unit.

* * * * *